United States Patent
Bächtiger et al.

(10) Patent No.: US 7,143,049 B2
(45) Date of Patent: Nov. 28, 2006

(54) METHOD AND SYSTEM FOR REGISTERING TICKETS

(75) Inventors: Rolf Bächtiger, Oberwil-Lieli (CH); Christoph Cronimund, Zürich (CH); Gérard Salzgeber, Zürich (CH); Reto Schreppers, Wettswil (CH); Bruno Wenger, Au/ZH (CH); Willi Brändli, Bergdietikon (CH); Aldo Rebsamen, Wil (CH)

(73) Assignee: Siemens VDO Automotive AG, Neuhausen (CH)

( * ) Notice: Subject to any disclaimer, the term of this patent is extended or adjusted under 35 U.S.C. 154(b) by 562 days.

(21) Appl. No.: 10/095,315

(22) Filed: Mar. 11, 2002

(65) Prior Publication Data
US 2002/0140553 A1 Oct. 3, 2002

Related U.S. Application Data

(63) Continuation of application No. PCT/EP00/08292, filed on Aug. 25, 2000.

(30) Foreign Application Priority Data

Sep. 10, 1999 (CH) .................................... 1665/99
Dec. 22, 1999 (CH) .................................... 2352/99

(51) Int. Cl.
*G06F 17/00* (2006.01)
(52) U.S. Cl. .......................................................... 705/1
(58) Field of Classification Search ...................... None
See application file for complete search history.

(56) References Cited

U.S. PATENT DOCUMENTS 5,418,525 A * 5/1995 Frei et al. .................... 340/5.6
5,541,583 A * 7/1996 Mandelbaum ........... 340/10.51
5,914,671 A 6/1999 Tuttle
6,700,493 B1 * 3/2004 Robinson .................. 340/573.1

FOREIGN PATENT DOCUMENTS

| | | |
|---|---|---|
| EP | 0 380 377 B1 | 8/1990 |
| GB | 2 246 896 A | 2/1992 |
| GB | 2 267 626 A | 12/1993 |
| WO | EP 0 330 071 | * 8/1989 |

OTHER PUBLICATIONS

Sbranti, J.N.; Amtrak to Scan Tickets; Jun. 26, 1999; KRTBN Knight-Ridder Tribune Business News; dialog copy 1 page.*
Anonymous; Washington, San Francisco move to smart cards; Jul. 1999; Railway Age v200n7 p. 24; dialog copy 2 pages.*

* cited by examiner

*Primary Examiner*—Thomas A. Dixon
(74) *Attorney, Agent, or Firm*—Laurence A. Greenberg; Werner H. Stemer; Ralph E. Locher

(57) ABSTRACT

A method and a system for registering tickets includes defining a waking zone with a transceiver unit having a transmitting unit, defining a registration zone with a registration transceiver unit, providing tickets having a processor, a memory, a ticket receiver, and a ticket transceiver for communicating between the waking zone and the tickets, transmitting a first information unit from the transmitting unit to the ticket receiver of a ticket located in the waking zone, activating the ticket transceiver of the ticket located in the waking zone with an item of information contained in the first information unit, at a beginning of ticket registration, setting up a bi-directional communication between the registration transceiver unit and a ticket transceiver of a ticket located in the registration zone through additional information units, and registering ticket presence to establish a service to be used or a defined presence.

37 Claims, 11 Drawing Sheets

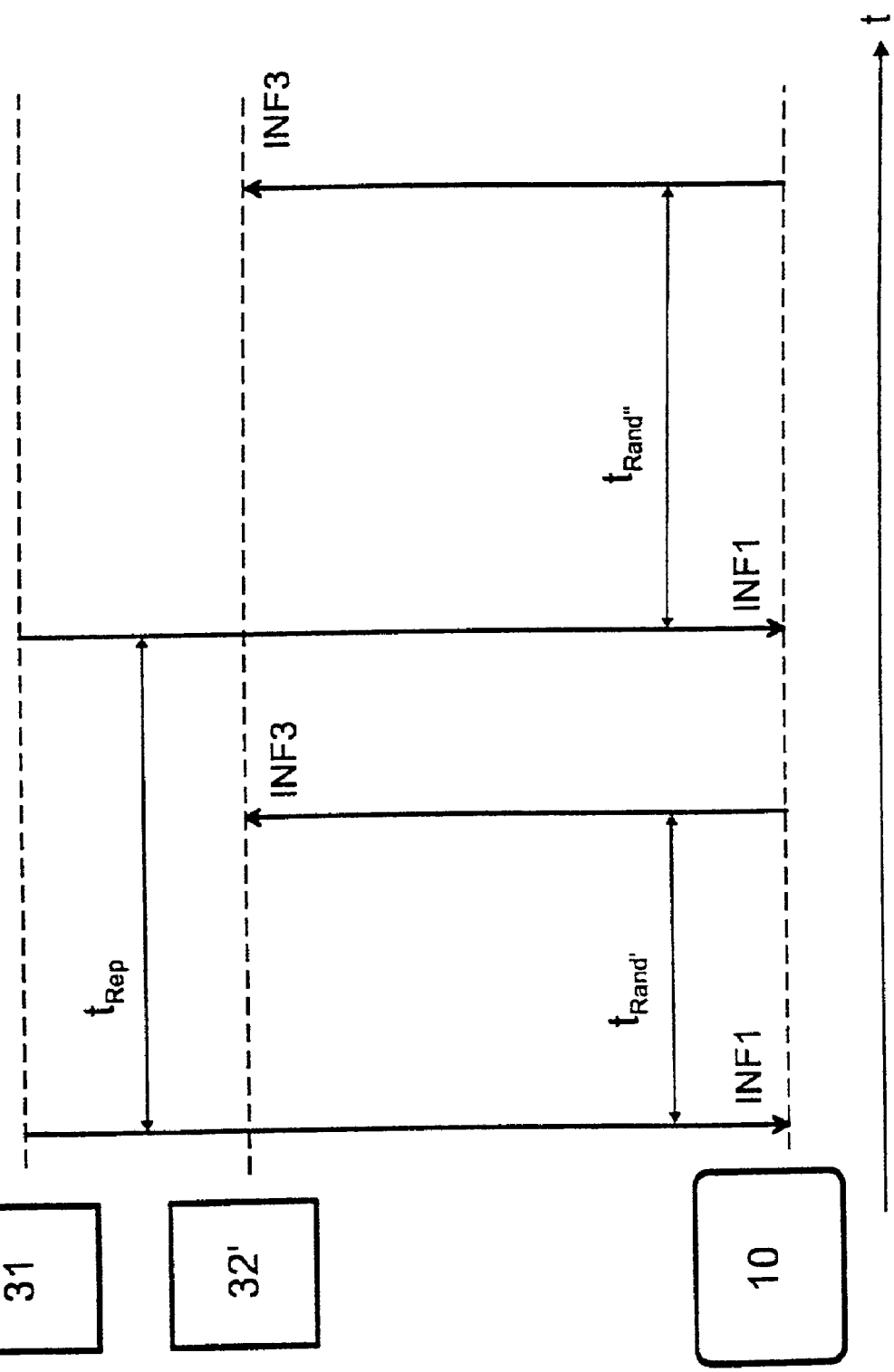

METHOD AND SYSTEM FOR REGISTERING TICKETS

CROSS-REFERENCE TO RELATED APPLICATION

This application is a continuation of copending International Application No. PCT/EP00/08292, filed Aug. 25, 2000, which designated the United States.

BACKGROUND OF THE INVENTION

Field of the Invention

The invention relates to a method and a system for registering tickets for establishing a service to be used and/or a defined presence, which tickets are provided with a processor module, a memory module, at least one first receiving module, and at least one transmitting/receiving unit, also referred to as a transceiver.

The issuing of tickets and collection of fares by automatic ticket machines or manned points of sale is expensive for the transport company and sometimes very inconvenient for the passenger. If a passenger arrives at the place of boarding immediately before the departure of a transport, the person no longer has time to get a ticket, and gets on board and risks being accused of being a fare dodger if there is a ticket inspection. Such a situation involves considerable costs and unpleasantness.

U.S. Pat. No. 5,418,525 to Frei et al. discloses a contactless identification system with electronic access cards, with which a person can be granted access to a closed area, for example, a building. The system described in U.S. Pat. No. 5,844,244 to Graf et al. additionally makes it possible to transmit data to the electronic access card, in order, for example, to change the access profile or disable the access card. These systems are not very suitable for the registration of electronic tickets because such a card only allows one person to be registered at a time.

The configuration specified in U.S. Pat. No. 5,541,583 to Mandelbaum allows a number of electronic tickets to be registered at a place of admission (for example, to the subway) or at a place of boarding (for example, the door area of a railway carriage).

The British Patent No. 2,246,896 discloses a ticket system for a transport in which location messages sent out by a broadcast method during a journey are stored on the tickets. When a passenger with such a ticket leaves the vehicle concerned, the location messages stored on the ticket and further data are inquired to check the validity of the ticket concerned for the journey undertaken.

For such a method—also referred to as "walk in/walk out"—the registration of electronic tickets must additionally satisfy the following conditions:
a) The registration must be thorough, for instance, the tickets in a coat pocket for a father and those for the children traveling with him must be registered.
b) No unwanted registration may take place, for example, if a person with such an electronic ticket helps another person to get on board, this other person must not be registered as a passenger from whom payment is required.
c) The registration must be as immune to fraud as possible, for instance, it should be possible to detect covering of the electronic ticket by a metallic foil.

Methods and systems of the type specified in U.S. Pat. No. 5,541,583 to Mandelbaum only inadequately satisfy requirements b) and c) given above as examples because the direction in which a registration zone is passed cannot be detected.

SUMMARY OF THE INVENTION

It is accordingly an object of the invention to provide a method and system for registering electronic tickets that overcomes the hereinafore-mentioned disadvantages of the heretofore-known devices and methods of this general type and that avoids the non-registration of genuine passengers or service users and the unwanted registration of persons with an electronic ticket and reliably detects attempted fraud by temporarily shielding the electronic ticket.

With the foregoing and other objects in view, there is provided, in accordance with the invention, a method for registering tickets, including the steps of defining a waking zone and associating the waking zone with at least one transceiver unit disposed in the waking zone, the transceiver unit having a transmitting unit, defining a registration zone and associating the registration zone with a registration transceiver unit and the waking zone, providing tickets having a processor module, a memory module, at least one ticket receiving module, and at least one ticket transceiver module for communicating between the waking zone and the tickets, transmitting a first information unit from the transmitting unit to a ticket receiving module of a ticket located in the waking zone, activating, with the processor module, the ticket transceiver module of the ticket located in the waking zone with an item of information contained in the first information unit, at a point in time determined by a beginning of a ticket registration, setting up a bi-directional communication between the registration transceiver unit and a ticket transceiver module of a ticket located in the registration zone through additional information units, and registering a presence of the ticket at least once to establish at least one of a service to be used and a defined presence.

In accordance with another mode of the invention, second and third information units include at least information concerning a location of the ticket and at least one of a date and a time, and the information is stored in at least one of an area of the memory module of the ticket and a data bank associated with an onboard computer, a remote computer system, and/or the registration transceiver unit.

In accordance with a further mode of the invention, a plurality of registration zones is defined and registration is carried out by registering a presence of a ticket only for all tickets located in the registration zone having received an identical item of information associated with at least one of the registration zones concerning the location and the date and time.

In accordance with an added mode of the invention, a fixed ticket transmitting locational information fields is provided, a receiving unit is attached to a vehicle, and the information concerning the location is transmitted with the locational information fields from the fixed ticket through the receiving unit to the registration transceiver unit utilizing the third information unit.

In accordance with an additional mode of the invention, based upon the information concerning the location, a virtual journey section number is transmitted in the information unit to the tickets located in the registration zone and the journey section number is changed for each section of a journey by a counting increment, and the journey section number stored on the ticket is compared with a current journey section number to determine if the ticket was correctly registered in previous sections of the journey.

In accordance with yet another mode of the invention, the ticket transceiver module of the ticket is intermittently activated.

In accordance with yet a further mode of the invention, an activation timepoint of the ticket transceiver module is established with an item of information in the first information unit and/or an item of information in the second information unit.

In accordance with yet an added mode of the invention, the activation timepoint of the ticket transceiver or transmitting module is determined with a random generator.

In accordance with yet an additional mode of the invention, the second information unit includes information identifying the ticket and/or personal information fields identifying a person assigned to the ticket, and a reception of the third information unit is acknowledged by transmitting a further second information unit to the respective ticket.

In accordance with again another mode of the invention, a frequency of the transmitting unit is selected to form a field of the registration or waking zone as a near field.

In accordance with again a further mode of the invention, a frequency of the registration transceiver unit or transmitting module is selected to form a field of the registration zone as a far field.

In accordance with again an added mode of the invention, the first information unit is transmitted from a writing/reading device to the ticket, the first information unit indicating one of an entitlement to use of a service and an identification, and bi-directional communication is set up between the writing/reading device and the ticket with the third information unit by activating the ticket transceiver module of the ticket located in the waking zone with the item of information contained in the first information unit. Alternatively, bi-directional communication is set up between the writing/reading device and the ticket with the further information unit by activating the transmitting module contained on the ticket with the item of information contained in the first information unit to cause transmission of the further information unit to the receiving unit of the registration transceiver unit.

In accordance with again an additional mode of the invention, the intermittent activation of the ticket transceiver module is monitored with a timing element and, if the ticket transceiver module is permanently activated, switching off the ticket transceiver module after a fixed time.

In accordance with still another mode of the invention, the setting up and registering steps are carried out by commencing bi-directional communication with the tickets through a registration transceiver unit lying within a registration area and performing a first registration in accordance with one of a state of the ticket and a pre-history of the communication both within a randomly determined respective time interval.

In accordance with still a further mode of the invention, the ticket transceiver module is a first ticket transceiver module and the tickets each have a second ticket transceiver module, and a passing zone associated with a stationary transceiver unit is defined, the second ticket transceiver module setting up one of unidirectional and bi-directional communication with the stationary transceiver unit, and access to the zone is granted and a presence of a ticket is registered in accordance with data stored in a memory area of the memory module and/or a data bank of a computer system associated with the second ticket transceiver module.

In accordance with still an added mode of the invention, the tickets each have a third ticket transceiver module, and an issuing machine having a fourth transceiver unit is provided, the third ticket transceiver module setting up bi-directional communication with the fourth transceiver unit, and personal-information fields identifying a person and/or personal-information fields associated with a person are stored in an area of the memory module.

In accordance with still an additional mode of the invention, registrations of the tickets are identified by attributes and performing actions, dependent on the attributes, selected from only acknowledging presence of the tickets and/or indicating use of a service requiring payment.

In accordance with a further mode of the invention, the attributes are established with the issuing machine through a communication with the third ticket transceiver module and, on an output module of the ticket, dependent upon the attributes, the attributes and/or a given item of information is displayed.

In accordance with an added feature of the invention, the ticket is registered for authorizing transportation, entry to an exhibition, and/or entry in a protected zone.

With the objects of the invention in view, there is also provided a method for registering tickets to establish at least one of a service to be used and a defined presence, including the steps of providing tickets each having a processor module, a memory module, at least one receiving module, and at least one transmitting module, defining a registration zone and associating the registration zone with a registration transceiver unit for communicating with the tickets, the registration transceiver unit having a transmitting unit and a receiving unit, transmitting a first information unit from the transmitting unit to the receiving module of tickets located in the registration zone, activating, with the processor module, the transmitting module contained on the ticket with an item of information contained in the first information unit to cause transmission of a further information unit to the receiving unit of the registration transceiver unit, and upon receiving the further information unit, registering a respective presence of tickets at least once as a ticket record.

In accordance with again an added mode of the invention, the writing/reading device is coupled to a network and the transmission of the entitlement to use of a service, contained in the first information unit, to the ticket is only enabled if the entitlement has been validated beforehand through the network.

In accordance with again an additional mode of the invention, the ticket is pushed into the writing/reading device and/or place onto the writing/reading device, the first information unit is transmitted to the ticket by an inductive coupling, and the further information unit is transmitted to the writing/reading device by an electromagnetic coupling.

With the objects of the invention in view, there is also provided a system for registering tickets at a given location including a waking zone and a registration zone for establishing at least one of a service to be used and a defined presence, including tickets each having a processor module, a memory module connected to the processor module, at least one receiving module connected to the processor module, and a ticket transceiver module, at least one transceiver unit for communicating with the receiving module, the transceiver unit including a transmitting unit disposed in the waking zone for communicating with the receiving module, a transceiver unit disposed in the registration zone, the transceiver unit setting up bi-directional communication with the ticket transceiver module when a respective one of the tickets is located in the registration zone, a data bank coupled to the transceiver unit, and at least one of the transceiver unit and the processor module being programmed to register a presence of the tickets in at least one of the waking zone and the registration zone as ticket records in a respective one of the data bank and the memory module.

In accordance with an additional feature of the invention, there is provided an onboard computer and a remote computer system, and the data bank is disposed in the transceiver unit, the onboard computer, and/or the remote computer system.

In accordance with yet another feature of the invention, communication between the tickets and the transceiver unit is at a given frequency through a given transmission method and the transmitting unit and the transceiver unit are connected to the onboard computer through a radio link at the given frequency and applying the given transmission method.

In accordance with yet a further feature of the invention, the tickets each have a second ticket transceiver module and a third transceiver unit communicates with the second ticket transceiver module.

In accordance with yet an added feature of the invention, the tickets each have a third ticket transceiver module and an issuing machine has a fourth transceiver unit communicating with the third ticket transceiver module.

In accordance with yet an additional feature of the invention, the issuing machine is a portable inspection unit having a display displaying the ticket records and/or a slot for receiving at least one ticket, the transmitting unit and the transceiver unit communicate with the inspection unit.

In accordance with again another feature of the invention, there is provided a receiving unit associated with the registration zone, a fixed ticket transmitting locational information concerning a given location with information fields to the receiving unit, and the receiving unit is coupled to at least one of the transmitting unit and the transceiver unit for supplying the locational information thereto.

In accordance with again a further feature of the invention, at least one information unit is transmitted to the tickets indicating one of an entitlement to use of a service and an identification and a writing/reading device has a ticket recording device, a processor system connected to the ticket recording device, a receiving antenna and a receiving amplifier connected to the receiving antenna and to the processor system, the receiving antenna inductively coupling to the tickets, and a transmitting antenna and a transmitting amplifier connected to the transmitting antenna and to the processor system, the transmitting antenna electromagnetically coupling with the tickets.

With the objects of the invention in view, there is also provided a system for registering tickets at a given location including a waking zone and a registration zone for establishing at least one of a service to be used and a defined presence, including tickets each having a processor module, a memory module connected to the processor module, at least one receiving module connected to the processor module, and at least one transmitting module, at least one transceiver unit for communicating with the tickets, the transceiver unit disposed in the registration zone and including a receiving unit disposed in the registration zone and at least one transmitting unit communicating with the receiving module and the transmitting module, the transmitting unit disposed in the registration zone, a data bank coupled to the receiving unit, and a presence of the tickets located in the registration zone being registered as ticket records in at least one of the memory module and the data bank by a first information unit transmitted to the tickets and a further information unit transmitted from the tickets to the receiving unit.

In accordance with still another feature of the invention, the transmitting unit or transmitting module transmits at a frequency to form a field in the registration zone as a near field.

In accordance with still a further feature of the invention, the transmitting module transmits at a frequency to form a field in the registration zone as a far field.

In accordance with a concomitant feature of the invention, at least the first information unit is transmitted to the tickets indicating an entitlement to use of a service and/or an identification, and a writing/reading device has a ticket recording device, a processor system connected to the ticket recording device, a receiving antenna and a receiving amplifier connected to the receiving antenna and to the processor system, the receiving antenna inductively coupling to the tickets, and a transmitting antenna and a transmitting amplifier connected to the transmitting antenna and to the processor system, the transmitting antenna electromagnetically coupling with the tickets.

The method according to the invention has various advantages.

First, the (transport) service actually used can be registered and, if need be, a charge can be made. In such a case, the actual traffic data (frequencies, occupation of the carriages, type of tickets) are available to the transport company virtually in real time.

Second, unwanted registration is avoided by the validation of the registration taking place during the journey or while the service is being used. The mere boarding of a vehicle or entering of an area does not bring about validated registration.

Third, persons with a ticket according to the invention who make use of a transport service or other service are always registered. Boarding very quickly, loitering in the entrance area or putting the ticket in an unusual place (for example, in one's shoes) cannot prevent registration.

Fourth, attempted fraud by shielding the ticket at the beginning and during use of a service can be detected. Attempted fraud at the end of use of a service is ineffective because validation of the registration takes place intermittently during the journey. Resistance to fraud can be enhanced considerably by random ticket inspection.

Fifth, the intermittent operation of a second transmitting/receiving module on the ticket according to the invention has the effect of minimizing the power consumption and, as a result, of achieving high autonomy.

Sixth, the bi-directional communication has the effect that the registered journeys are contained both on the ticket and in a data bank associated with the registration zone and also in a stationary computer system for evaluation and/or billing.

Seventh, in a special refinement of the invention, the tickets may be provided with a display module. This allows general or specific information for the attention of the person concerned to be displayed.

Eighth, the use of an electronic ticket as a locational marker allows a low-cost transmission of locational information to a vehicle traveling past.

Ninth, the chosen method of transmission allows a reading/writing device to be used for reliable information transmission to an electronic ticket without a complex mechanical insertion device being required.

The invention is not restricted to the transport sector but can also be used for electronic admission or entry tickets, for example, to an exhibition. It is also possible to construct the invention as an identity card. The term "ticket" used herein document, therefore, also always covers the terms "admission ticket", "entry ticket," or "identity card" and similar tickets and passes.

Other features that are considered as characteristic for the invention are set forth in the appended claims.

Although the invention is illustrated and described herein as embodied in a method and system for registering tickets, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 11 is a signal-flow timing diagram of individual method steps for registration of an electronic ticket according to the invention.

DESCRIPTION OF THE PREFERRED EMBODIMENTS

Figure 2:
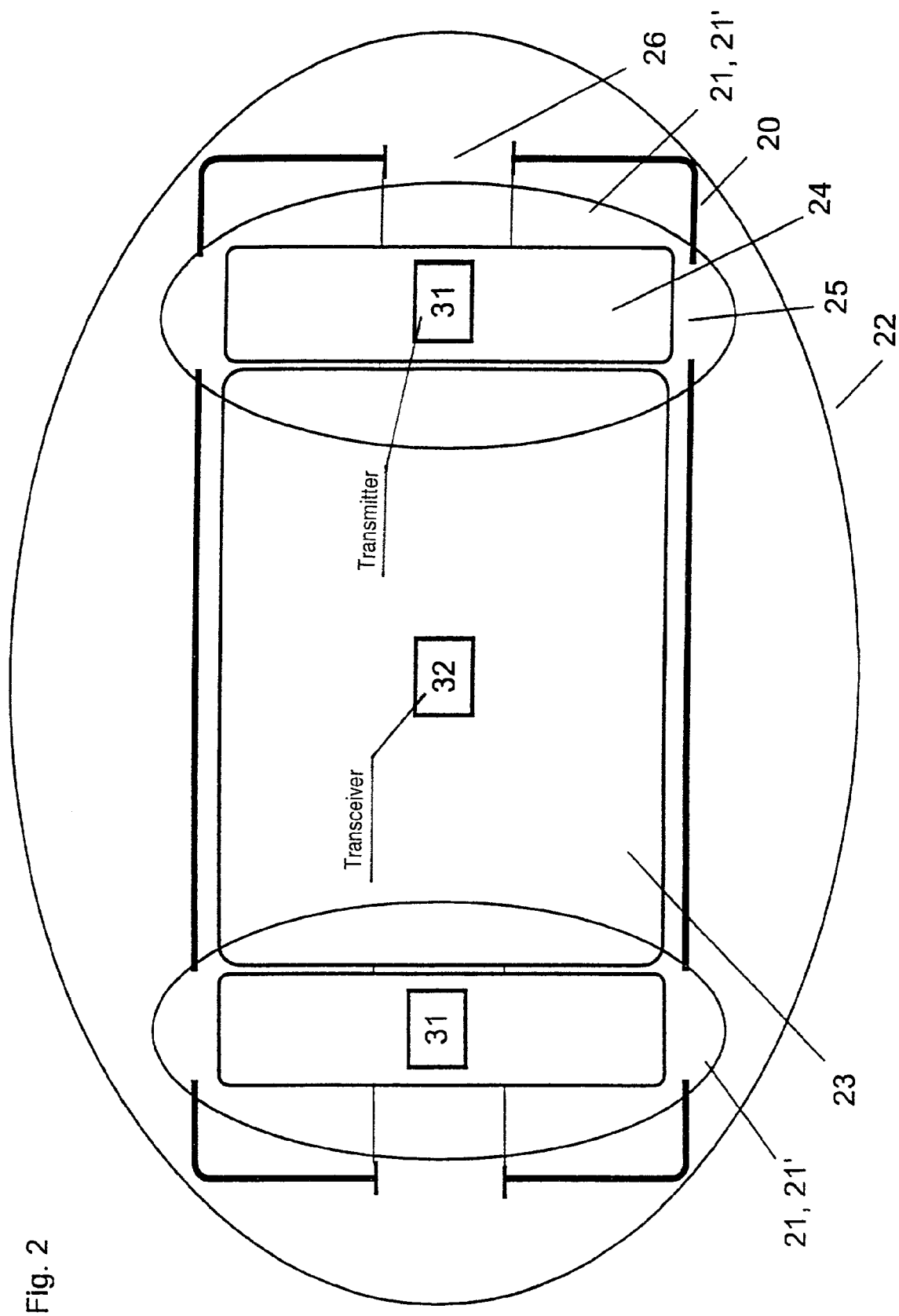
FIG. 2 is a diagrammatic representation of a vehicle with a configuration of a first transmitting unit and a second transmitting/receiving unit and the associated zones according to the invention.

Referring now to the figures of the drawings in detail and first, particularly to FIG. 2 thereof, there is shown the outline of a railroad carriage 20 with a boarding area 25 at each end of the carriage and also a passing-through area 26. The passing-through area 26 makes it possible to pass through to a further carriage of a train. These two areas 25, 26 allow access through a platform 24 to the passenger compartment 23. Doors have not been depicted for the sake of clarity. The platform 24 and the passenger compartment 23 may be open or provided with a wall and an associated door. Associated with each of the two platforms 24 is a first transmitting unit 31, which covers the entry zone 21 concerned with an electromagnetic field in a waking zone 21'. In applications other than in the instant example with a railroad carriage, the entry zone 21 need not necessarily coincide with the platform 24. A second transmitting/receiving unit 32 is associated with the passenger compartment 23 and likewise covers a registration zone 22 with an electromagnetic field. The zones depicted correspond approximately to the coverage with regard to a minimal field strength of the transmitting units 31 and 32 concerned. The waking zone 21' is preferably associated with the entry zone 21, but it is also possible to place the waking zones 21' at other locations, for example, for a number of waking zones 21' to cover a registration zone 22 or for one or more waking zones to overlap only slightly with the registration zone 22.

Figure 1:
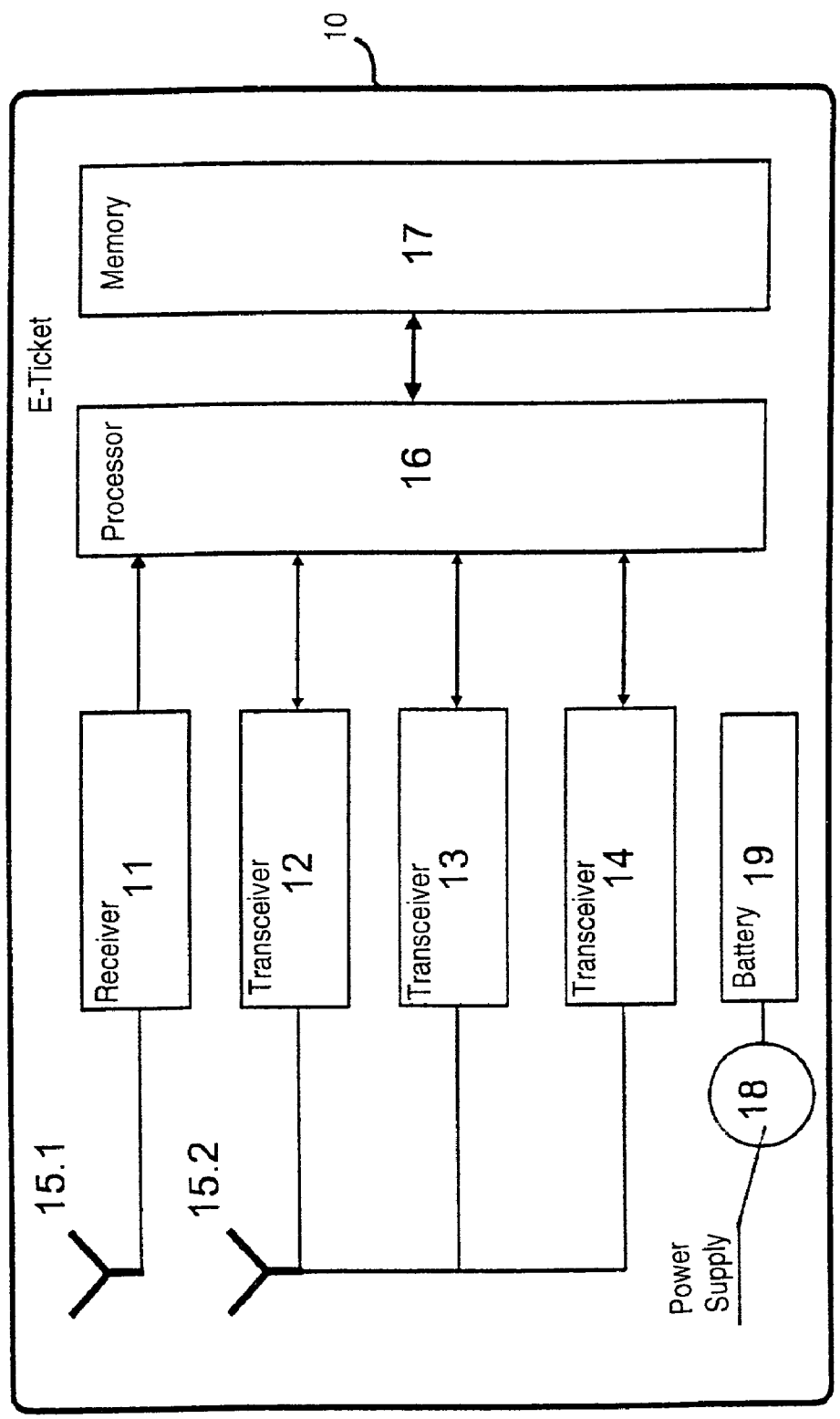
FIG. 1 is a block circuit diagram of an electronic ticket for the method according to the invention.

FIG. 1 is a block diagram of an electronic ticket 10. Such tickets 10 preferably have a credit card format. These tickets 10 can be used both as a credit card and as a debit card. With respect to the technology, such portable cards are referred to by a person skilled in the art, for example, with the term "smart card". See, i.e., U.S. Pat. No. 5,541,583 to Mandelbaum or U.S. Pat. No. 5,878,124 to Griesmer et al. Provided in the block diagram as the central control unit is a processor module 16, connected to an associated memory module 17 and also to a receiving module 11, a second transmitting/receiving module 12, a third transmitting/receiving module 13, and a fourth transmitting/receiving module 14. Depending on the chosen frequencies, only one or more than one antenna may be provided. In the embodiment according to FIG. 1, two antennas 15.1 and 15.2 are provided. The power supply takes place by a battery 19 and a power supply module 18; the connections are not depicted for the sake of clarity. The function, the air clearances to be bridged and the sensitivity of the various transmitting/receiving modules are explained in Table 1, in which the sensitivity ratings given are intended to be relative to one another.

TABLE 1

| Reference numeral | Function | Approximate range | Sensitivity of receiving module |
|---|---|---|---|
| 11 | Activation of the tickets in the entry zone. | 3 m | Low |
| 12 | Bi-directional communication of a number of electronic tickets with a transmitting/receiving unit in a registration zone. | 20 m | High |
| 13 | Communication of a transmitting/receiving unit in a passing zone with precisely one ticket in each case. | 0.6 m | Moderate |
| 14 | Bi-directional communication with an issuing machine for the initializing/ "personification" of the ticket 10 and for an insight into the journeys registered. | A few cm | Very low |

Figure 3:
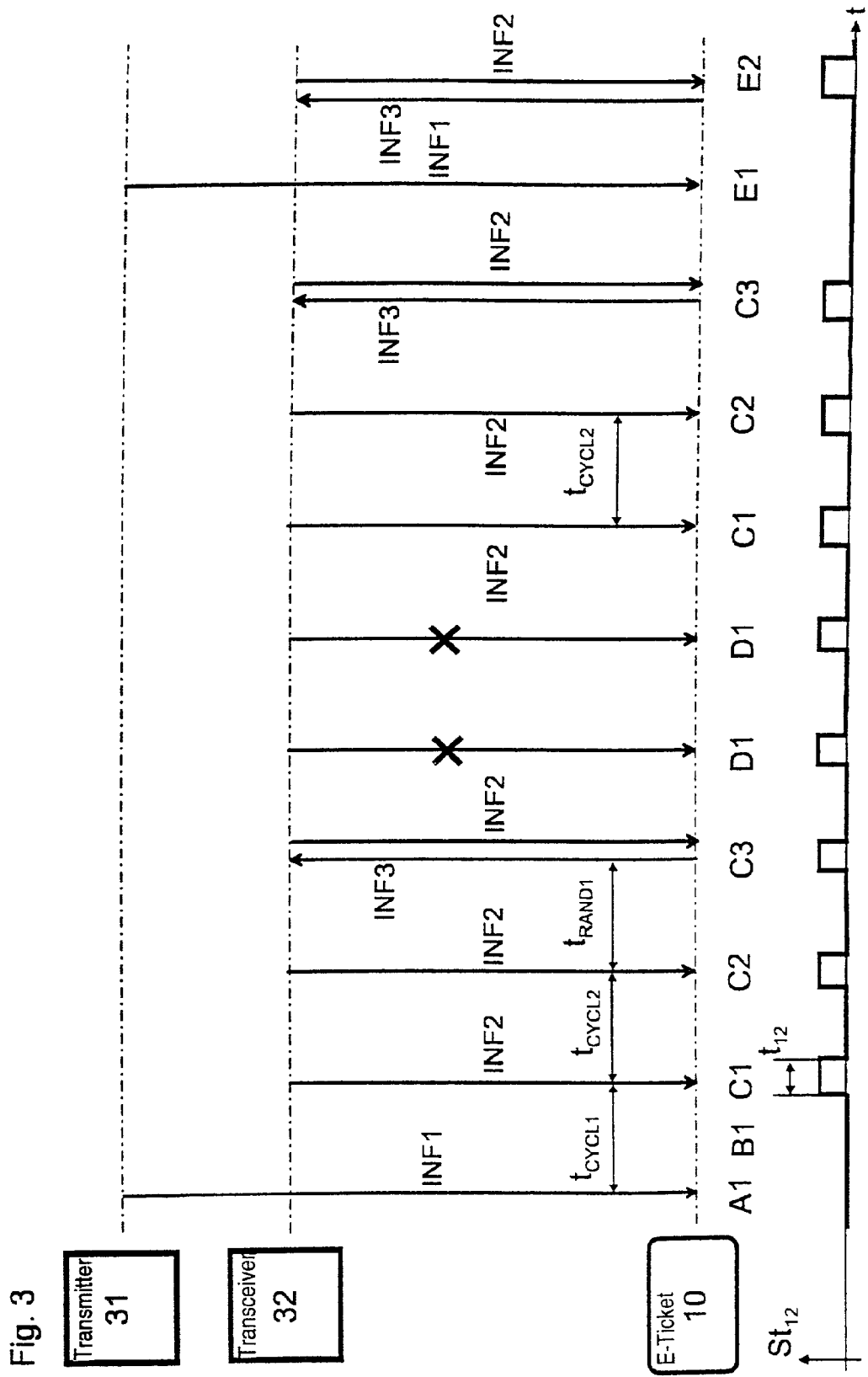
FIG. 3 is a signal-flow timing diagram illustrating steps for registration of an electronic ticket according to the invention.
Figure 4:
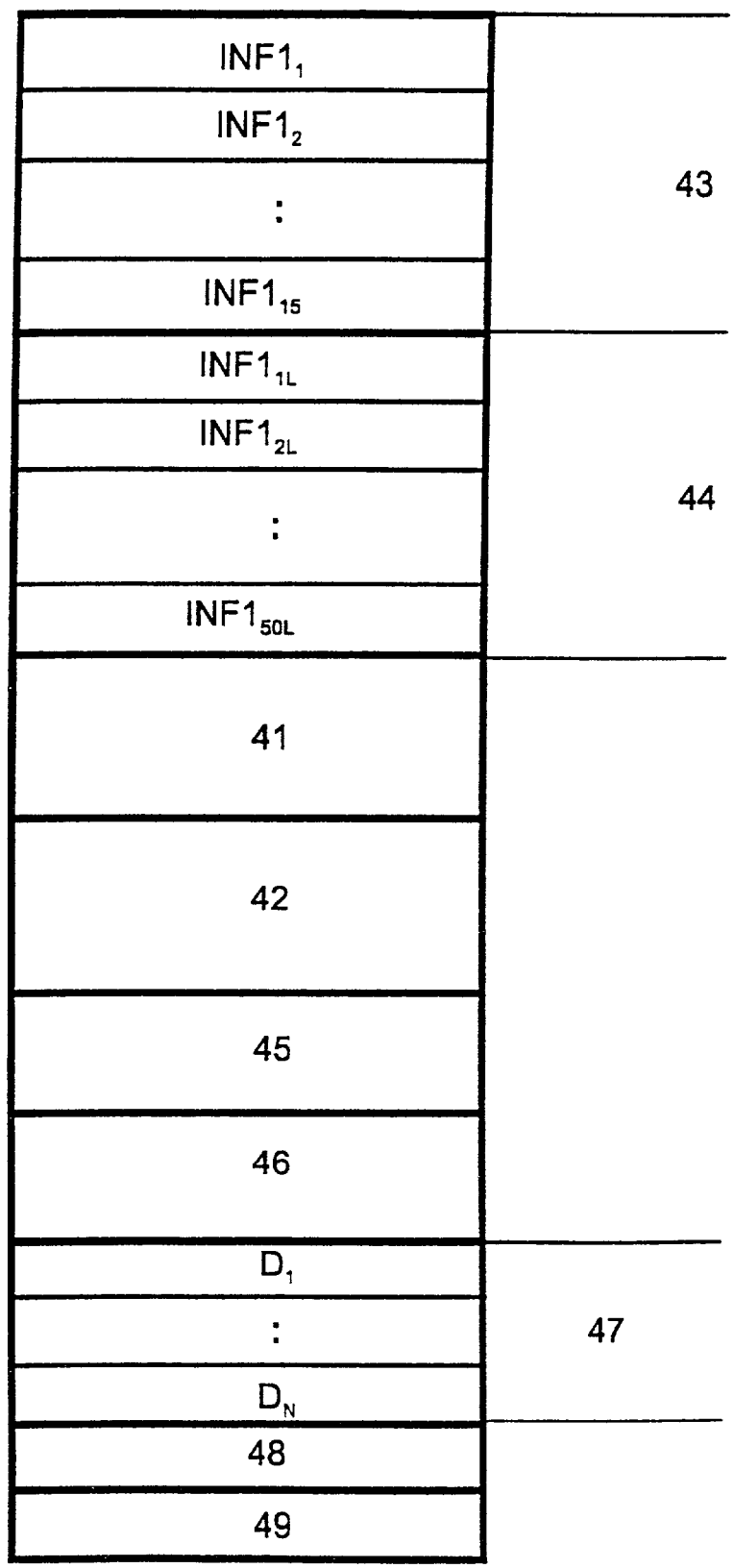
FIG. 4 is a block diagram illustrating functional and logical portions of areas of the memory module of FIG. 1.

The method according to the invention is now explained with reference to FIG. 3, which shows the information flow over the air clearances between a first transmitting unit 31, a second transmitting/receiving unit 32, and an electronic ticket 10. FIG. 2 should be referred to for the sequence of movements of a person P who is carrying such a ticket 10 (for example, in his wallet) and for the spatial configuration in a railroad carriage 20. FIG. 4 reveals the type of storage of the various information units and fields.

Method Step A1

The ticket 10 is in a power-saving "sleeping state", i.e., only the first receiving module 11 is ready to receive. If a person P in a station approaches the boarding area 25 of a railroad carriage 20, the person P with the ticket 10 enters what is referred to as the entry zone 21. When the doors are open, the first transmitting unit 31 sends out an information unit periodically, for example, at intervals of 0.5 s. The information unit, referred to as INF1, has a structure as shown in Table 2.

TABLE 2

Information unit INF1

| Information fields | Meaning |
| --- | --- |
| CYCLE1 | Time unit and time reference |
| COMMAND1 | Commands to the ticket 10 |
| POSITION1 | Location, place of boarding |
| COURSE1 | Course and/or carriage number |
| DATETIME1 | Date and time of day |
| TYPE1 | Type of transport |

The information specified is stored in the ticket 10 in an area 43 of the memory module 17: $INF1_n$. See FIG. 4. Repeated reception of the information unit then causes further, separate storage $INF_{n+1}$ if the field COURSE1 has changed, which occurs if the person P has boarded the carriage 20 of a train X and immediately alights again and subsequently boards the carriage of a train Y. Such an operation also occurs when a person P with the ticket 10 according to the invention walks past close to an entry zone 21 of a carriage 20 of another train. If the information specified in the field COURSE1 are retained, preferably only the fields CYCLE1 and COMMAND1 are updated. Such operation is not restricted to one ticket 10, but takes place simultaneously for all the tickets 10 located in the entry zone 21.

Method step B1

With the reception of information units INF1 with the fields COMMAND1 and CYCLE1, a timing element of the processor module 16 is initialized. The timing element causes intermittent switching on of the second transmitting/receiving module 12 according to a cycle time $t_{CYCL1}$ contained in the field CYCLE1. The time reference is also defined in the field CYCLE1. In FIG. 3, the respective switching state is denoted by $St_{12}$; the individual method steps A1, C1, C2, etc. are entered equidistantly in FIG. 3; the indicated time periods $t_{CYCL1}$, $t_{CYCL2}$, etc., may be different, however: if a person P in a station enters the area of different entry zones 21, the cycle times respectively received according to the field CYCLE1 may likewise be different. The processor module 16 accordingly switches the transmitting/receiving module on and off in accordance with the various cycle times (intermittent reception readiness).

Method Step C1

As long as the train has not yet departed, the ticket 10 receives an information unit INF2 from the second transmitting/receiving unit 32 at an interval defined according to the information field CYCLE1, for example $t_{CYCL1}=10$ s. The structure of the information unit INF2 is similar to that of INF1 according to Table 2. Additional fields ADDRESS2 and APPLICATION2 are provided to identify the transmitting/receiving unit 32 concerned or to specify more precisely the use of the registration according to the invention. The information unit, referred to as INF2, has a structure according to Table 3.

TABLE 3

Information unit INF2

| Information fields | Meaning |
| --- | --- |
| CYCLE2 | Time unit and time reference |
| COMMAND2 | Commands to the ticket 10 |
| POSITION2 | Location |
| COURSE2 | Course number |
| DATETIME2 | Date and time of day |
| TYPE2 | Type of transport |
| ADDRESS2 | Address of the transmitting/receiving unit 32 |
| APPLICATION2 | Application |

Method Step C2

When the doors of the train are closed, for example, immediately before departure, the first transmitting unit 31 is switched off, for which purpose a door contact may be used. The method step C1 has the effect that further information units INF2 are transmitted to the ticket 10, for example, the cycle $t_{CYCL2}$ can be reset, for example $t_{CYCL2}=120$ s. After departure, the registration begins in that, in the field COMMAND2, there is the instruction to mark the place of boarding stored at the beginning, or the current location last received,—according to the field POSITION2. In a simplified embodiment of the invention, it is possible to dispense with such marking and for the marking to be performed by the subsequent method step C3, by transmission of the current location. The marking is only performed, however, for that memory entry of $INF1_X$ if the identical information, i.e., course number, is contained in the field COURSE2. The remaining units $INF1_2$, $INF1_3$, ... stored in the area 43 are shifted after the elapse of a defined time into the area 44, entries $INF1_{1L}L$, $INF1_{2L}$, etc. As used herein, L stands for "lost". The information unit INF2 is received by all activated tickets 10 located in the registration zone 22. In the course of the time or journey, the respective location is indicated in the field POSITION2. It is possible that, together with the information specified in the fields COMMAND2 and CYCLE2, the cycle time for the further communication is changed once again, for example, $t_{CYCL2}=480$ s. Such a change allows an adaptation to the type of transport concerned, for example, a much greater cycle time may be used in an intercity train than in a streetcar. It is possible for the method step C2 to be executed several times, if need be with different contents in the fields CYCLE2, COMMAND2, and POSITION2. At least those information units with the same information specified according to the field COURSE2 are stored in a short-term registration memory 41 of the memory module 17.

Method Step C3

In the field COMMAND2, a request that the ticket 10 is to transmit an information unit INF3 to the transmitting/receiving unit 32 located in the carriage 20 has been transmitted in accordance with method step C2, the point in time of the transmission being determined by a time $t_{RAND2}$, which either corresponds to a time specified by the transmitting/receiving unit 32 or is randomly chosen by the processor module 16 by a non-illustrated random generator.

The information specified by COMMAND2 and CYCLE2 has the effect that collisions are largely avoided, but are not ruled out. Before the transmitting/receiving module 12 sends out an information unit INF3, a detection takes place as to whether the time slot concerned is not already occupied by another ticket 10 or by a transmitting/receiving unit 12 of another train located in the vicinity (parallel journey, crossing of two trains). Any collision problems that may occur can be solved by conventional methods, for example, by the Carrier Sense Multiple Access with Collision Detection (CSMA/CD) method.

The information unit INF3 has a structure according to the information specified in Table 4.

TABLE 4

Information unit INF3

| Information fields | Meaning |
| --- | --- |
| ADDRESS3 | Received address of a transmitting/receiving unit 32 |
| COURSE3 | Course number |
| POSITION3 | Marked location |
| ACTPOSITION3 | Current position according to the POSITION2 last received |
| DATETIME3 | Date and time of boarding |
| TYPE3 | Type of ticket |
| TICKET_NR3 | Ticket number |
| TICKET_OWNER3 | Ticket owner |
| ATTRIBUTES3 | Properties |
| STATE3 | State information |

Only those units INF3 that coincide at least with respect to the information specified in the field COURSE3 are processed in the transmitting/receiving unit 32. Depending on the information specified in the field ADDRESS3, the units received may be stored either in a data bank, associated with the carriage and/or train, of a computer system referred to here as the onboard computer 35. See FIG. 5. These units are referred to hereinafter as ticket records. The stored record records the presence of a ticket 10, specifying the respective location and respective date and time of day. The specified location information is available in a control system of the vehicle or train concerned, for example, through Global Positioning System (GPS) receivers or through an especially advantageous use of the ticket according to the invention as markers. Such an embodiment is described further below. The field ADDRESS3 contains the identity of the transmitting/receiving unit 32 last received by INF2. With such information specified in ADDRESS3 and the information specified in COURSE3, it can be established whether or not a passenger with a ticket 10 has moved within the train from one carriage 20 to another carriage 20'. Such is necessary because the cycles may vary from carriage to carriage of the same train. Similarly, the information is required to identify possible incorrect registrations if overlaps occur between the registration zones 22 of different vehicles, for example, two trains or two motorbuses on a parallel journey. The field STATE3 contains state information and/or what is referred to as history information (prehistory). Consequently, any attempted fraud, for example, a passenger enclosing the ticket 10 in a metal case during a journey and taking it out later, can be detected. It need not however only be attempted fraud. Such could also occur if a ticket 10 is kept in a piece of baggage, the piece of baggage being placed at a location where cancellation effects may occur on account of reflections (Raleigh fading) or on account of unintentional shielding by metal objects. Immediately after sending out an information unit INF3, an acknowledgement with an information unit INF2 is given by the transmitting/receiving unit 32 concerned. The items of information required for the acknowledgement are contained in the fields COMMAND2, ADDRESS2, and APPLICATION2, in particular, also the identity of the ticket 10 according to the field TICKET_NR3 in the information unit INF3.

Method Step D1

In this step, it is assumed—as explained under step C1—that the ticket 10 can no longer be reached by the transmitting/receiving unit 32. The ticket 10 will then not be able to receive any information units INF2 and not be able to transmit any information units INF3 to the second tp transmitting/receiving unit 32. The state is established both by the processor module 16 and by the onboard computer 35 associated with the carriage or train. Consequently, the ticket records stored in the data bank of the onboard computer 35 are provided with a flag and can be transmitted to a remote computer system 36 outside the train. See FIG. 5. On the ticket 10 itself, the stored position data are preferably likewise provided with a flag and stored in the short-term registration memory 41. Such a case also occurs whenever a person with the ticket 10 according to the invention leaves the carriage at the place of alighting.

Method Step E1

This step E1 is based on the following two cases:

If a person P with the ticket 10 according to the invention leaves the carriage through the entry area 21, the information unit INF1 transmitted through the receiving module 11 is recognized by the processor module 16 as belonging to the journey concerned, but it is not analyzed any further.

It is assumed that the duration of the break in communication was so great that the ticket 10 has reverted to the "sleeping state". If a person P with a "sleeping" ticket 10 leaves the railroad carriage 20, the ticket 10 receives a further information unit INF1. According to the information specified in the memory areas 43 or 44, i.e., based upon a comparison with respect to the fields POSITION1, COURSE1, DATETIME1, it can be established by the processor module 16 that the registration in progress has failed. In such a case, the processor module 16 instigates the immediate transmission of an information unit INF3.

Method Step E2

This step is executed in accordance with the following three preconditions:

According to step E1, the ticket 10 has been "woken". In such a case, the processor module 16 instigates the immediate transmission of an information unit INF3 with the fields POSITION3 and ACTPOSITION3 to the transmitting/receiving unit 32, which ensures registration even in such a case. The transmission of information in this case can also be taken from FIG. 7 for the ticket with reference number 102.

The reception of an information unit INF1 has the effect according to the method step A1 and B1 that the ticket 10 is "woken", i.e., the transmitting/receiving module is intermittently switched to reception readiness for a fixed time. If in such a time the ticket 10 does not receive any information units INF2 from the transmitting/receiving unit 32 corresponding to the one entry zone 21 (same carriage or same train), the processor module 16 instigates transmission of an information unit INF3 before "going back to sleep". If, after repeated attempts there is no acknowledgement with an information unit INF2, the corresponding entry of INF1 is shifted into the area 44 of the memory module 17. If no further current entries INF1 are contained any longer in the area 43, the ticket 10 is put into the sleeping state by the processor module 16.

In a special further development of the invention, it is provided that, at a random time interval, for example, in a range from 10 minutes to 4 hours, a ticket 10 sends out an information unit INF3 to receive a response from any transmitting/receiving unit 32 and, thereby, make registration possible.

Figure 5:
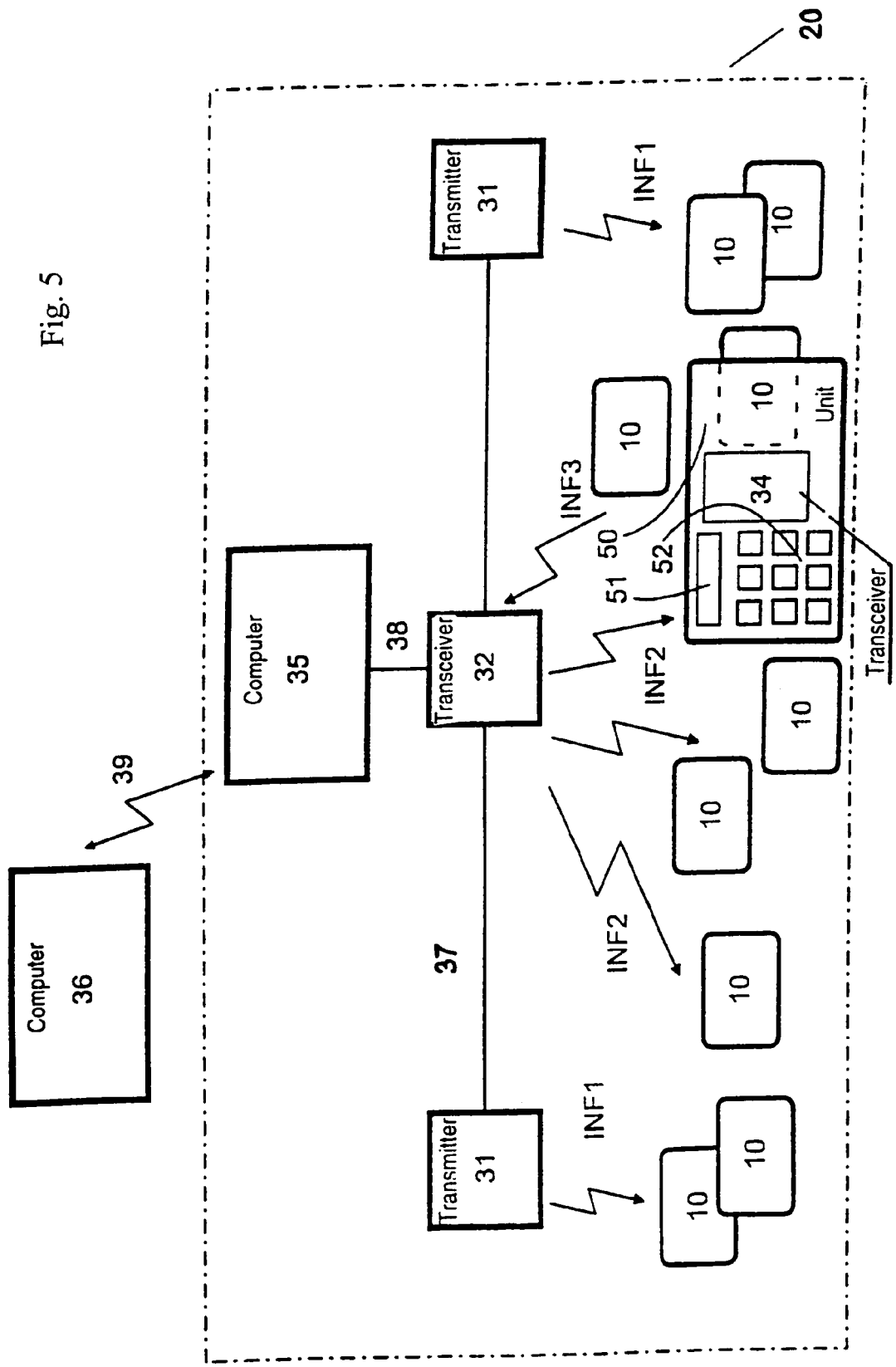
FIG. 5 is a block circuit diagram of the overall system and information flows in the registration of electronic tickets according to the invention.

Shown in FIG. 5 is a system and the information and data flow for the registration of tickets 10. The transmitting unit 31 and transmitting/receiving unit 32 disposed in a carriage are connected to an onboard computer 35. Such an onboard computer may be provided for each carriage 20 or for each train. The connections 37 and 38 may be wired, for example, what is referred to as a train bus, or accomplished through a radio link. If accomplished with a radio link, preferably, the same frequency and the same transmission method are used as for the connection between the transmitting/receiving unit 32 and the transmitting/receiving module 12. The onboard computer 35 contains a non-illustrated data bank, in which the registrations that have taken place are stored as what are referred to as ticket records. Depending on the application, these ticket records are transmitted immediately after registration or after the established completion of a journey to a stationary computer system through a connection 39. Global System for Mobile Communication (GSM) technology is preferably used for the connection 39. If the method according to the invention is used in an exclusively stationary environment, for example, at an exhibition or in a museum, the link is advantageously made as a line-based link by the conventional methods and techniques, for example, as a Local Area Network (LAN).

The transport service to be billed is determined by a remote computer system 36 in what is referred to as post-processing, based upon the registered ticket records in their entirety.

The reception of the information unit INF1 in the entry zone 21 must be made especially dependable. To achieve the best possible penetration (through clothes, bags) and to provide the receiving module 31 with a—relatively considered—low sensitivity, and, consequently, to ensure a low power consumption, a frequency range in which the entry zone is in the near field of the electromagnetic field emitted by the transmitting unit 31 is preferably provided, i.e., what is referred to as the H field component dominates. The near field is usually defined by $r<0.6\cdot\lambda$, where $\lambda$ stands for the wavelength. For an extent of (2·6) m of the entry zone 21, a frequency of 30 MHz is obtained. In practice, frequencies of 27 MHz and of 13.5 MHz have proven to be particularly advantageous.

The method according to the invention with the intermittent operation of the transmitting/receiving module 12 makes possible a high level of autonomy. The following approximate calculation applies:

The ticket 10 or the transmitting/receiving module 12 is activated at intervals of $t_{CYCL1}=60$ s for $t_{12}=10$ ms: 10 ms: 60 s produces a duty cycle of 1/6000. Taking into account a transient reaction and a corresponding load peak, the following data are taken as a basis:

Current consumption: 5 mA Voltage: 3 V

Average current consumption: 5 mA/6000=0.833 µA;

The required battery capacity, rounded up, is: 1 µA·26280 h=26 mAh. Batteries for smart cards with a capacity of 50 mAh and above are available on the market.

In a vehicle, it is especially important for the registration of the tickets 10 to be addressed by radio transmission independently of the position. The tickets 10 may also be contained in bags and these bags are either placed under a seat or on a rack near the ceiling. The field emitted by the transmitting/receiving unit 32 should have sufficient field strength and good propagation properties, as far as possible throughout the carriage. For such a purpose, a frequency which lies somewhat below the GSM 900 frequency range is preferably provided. The frequency of 868 MHz is particularly advantageous. Depending on the legal regulation, the frequency of 433 MHz may also be used. It may be provided on the ticket 10 that the intermittent activation of the second transmitting/receiving module 12 is monitored by a timing element. If permanently activated, the second transmitting/receiving module 12 is switched off after a fixed time. The switching off takes place in order not to disturb the communication with the other tickets any further.

The various areas of the memory module 17 are represented in FIG. 4. The further areas required for the method according to the invention have the following four main functions:

In the memory area 41, what are referred to as the short-term registrations are contained, while in the memory area 42 the long-term registrations are stored. Such a distinction is necessary from at least two aspects. It is necessary for the method according to the invention that transport companies carry out a random inspection by personnel. For such a purpose, it must also be possible for the data located on the electronic ticket 10 to be viewed by the inspection personnel by inspection units 50.

The entry zones 21 and registration zones 22 of different route-bound vehicles may overlap, for example, immediately after motor buses leave a bus station, such a case may occur on a multi-lane streets:

a) Incorrect registration in the event of overlapping of the entry zone is detected by the following embodiment of the invention. Provided in the memory module 17 are a number of areas in which the information contained in the information unit INF1 is stored. Once the journey has started, the bi-directional communication is commenced by the method steps C1, C2, . . . With the information contained in INF2, the original first entry according to the information unit INF1 received can be identified by an evaluation of the contents of the fields of COURSE, DATETIME, POSITION.

b) Incorrect registration in the event of overlapping of the registration zones is improbable, in principle, one reason being the agreed communication cycles, but is not impossible. If in fact an information unit INF2 is received from a registration zone traveling, for example, in parallel—it is quite conceivable for there to be a number of such transmissions—it can be detected immediately by the processor module 16, based upon the information specified in the fields COURSE and/or ADDRESS, that this entry is to be discarded.

In a further development of the method according to the invention, a third transmitting/receiving module 13 is provided on the ticket 10. Certain services should in any event only be accessible to the actually entitled persons. The accessibility is generally accomplished by special turnstiles or barriers, which only allow access to a person who has been granted admission by inserting a ticket into a reading/writing unit and subsequent devaluation invalidation or charging. The insertion of the ticket is inconvenient for the users and reduces the admission numbers considerably. For such a purpose, in a passing zone to the left and right there is respectively provided a third transmitting/receiving module 13, which commences unidirectional or bi-directional communication with the ticket 10, depending on the type of registration and/or charging chosen. The structure of the messages exchanged is the same or similar to that indicated above in Tables 1 to 3. The data storage therefor is provided in the area 47. Because a ticket 10 is intended to be used for a number of such access zones (for example, ski lift in resort X and ski lift in resort Y) and the credits concerned on the ticket 10 must not be offset against one another, the area is correspondingly subdivided into partitions $D_1 \ldots D_N$.

Another transmitting/receiving unit 34 is provided for initialization or inspection of the ticket 10. An issuing machine can perform initialization by transferring a credit. Such an issuing machine may be used both by the public and by a point of sale. The portable inspection unit 50 mentioned above can be used for checking the electronic tickets 10.

FIG. 5 reveals how such an inspection unit 50 is embedded in the system according to the invention. A keypad 52 and a display element 51 are provided for the interaction. Likewise contained in the inspection unit 50 are a first receiving module and a second transmitting/receiving module, which can receive information units INF1 and INF2 from the first transmitting unit 31 and the second transmitting/receiving unit 32 disposed in the carriage 30. As such, the current position of a carriage is stored in the inspection unit 50. As a result, an up-to-the-moment inspection of the tickets 10 carried by passengers is ensured. The inspection unit also allows a passenger to verify the serviceability of the system according to the invention, for example, that of the first transmitting unit 31. With the inspection unit 50, the registrations contained in the first journey registration memory 41 and in the second journey registration memory 42 can be displayed in plain text, which makes it possible to establish when and where the registration of a ticket was begun or was completed. The configuration allows attempted fraud during the journey to be demonstrated. In the area 49 of the memory module 17, the data identifying a person are stored. It is also possible for the digital image of the person concerned likewise to be stored in the area 49. The image is required, for example, when carrying out a ticket inspection. Data access to the various memory areas is determined, on one hand, by the transmission path, i.e., through which receiving module 11, 12, 13, or 14 information is being transmitted, and, on the other hand, by the structure of information units transmitted. The transmission path is preferably detected based upon a (minimal) level that has to be present at the input of the processor module 16. In addition, there must be coincidence in respect of the structure of the information unit and an authentication must be performed. At the output of the receiving module 11, an additional attenuation element may also be provided.

The memory area 45 serves as a program memory, while temporarily required data, for example, interim results based upon enciphering/deciphering operations to be performed for the transmission with the transmitting/receiving modules 11 to 14, are stored in the area 46.

With the issuing machine mentioned above, the public can provide a ticket 10 with further properties (ATTRIBUTES), for example, the ticket can be activated or deactivated, which is necessary if a person carries a number of tickets and there must not be a registration where payment is required. In a further refinement of the invention, the activation/deactivation of the ticket 10 may also take place on a logical basis. Even a deactivated ticket 10 is registered, but it is additionally specified in an information field that the presence of such a ticket does not lead to registration where payment is required. Similarly, the issuing machine can be used, for example, to transfer a certain number of persons to the ticket, so that a number of persons P can undertake a journey with a single ticket 10.

On the ticket 10, a display module may be additionally provided, one reason being to allow certain data and states of the ticket 10 as the using person P himself to be viewed. By additional fields in the information units INF2 and INF3, it is also possible to display certain information.

In another embodiment of the invention, the first transmitting unit 31 is not switched off after the departure of the train. Such a process is preferably performed whenever the individual registration zones of a train each have an identification of their own and, in particular, these registration zones cannot be associated with a consistent train number in accordance with the field COURSE.

The configuration of the transmitting unit 31 and the transmitting/receiving unit 32 is not restricted to that according to FIG. 2, but, instead, may be adapted to the respective application. In particular, it is also envisaged to place the two units in one housing and to predetermine by a corresponding controller which of the two units 31 and 32 is permanently or intermittently activated.

As an alternative to the particulars specified in the method step D1, the data bank may be disposed in the second transmitting/receiving unit 32 itself. Such a configuration allows dependable registration of the tickets present in a registration zone 22 in the case in which the connection to the onboard computer is interrupted. It is also possible that, when the second transmitting/receiving unit 32 has a compact type of construction, the registered data are transmitted from the latter through a connection 39 to the remote computer system 36. The data bank may be coupled in a wireless or wire-bound manner to the second transmitting/receiving unit 32; the configuration of the data bank is not restricted to the onboard computer 35 or the remote computer system 36.

Figure 6:
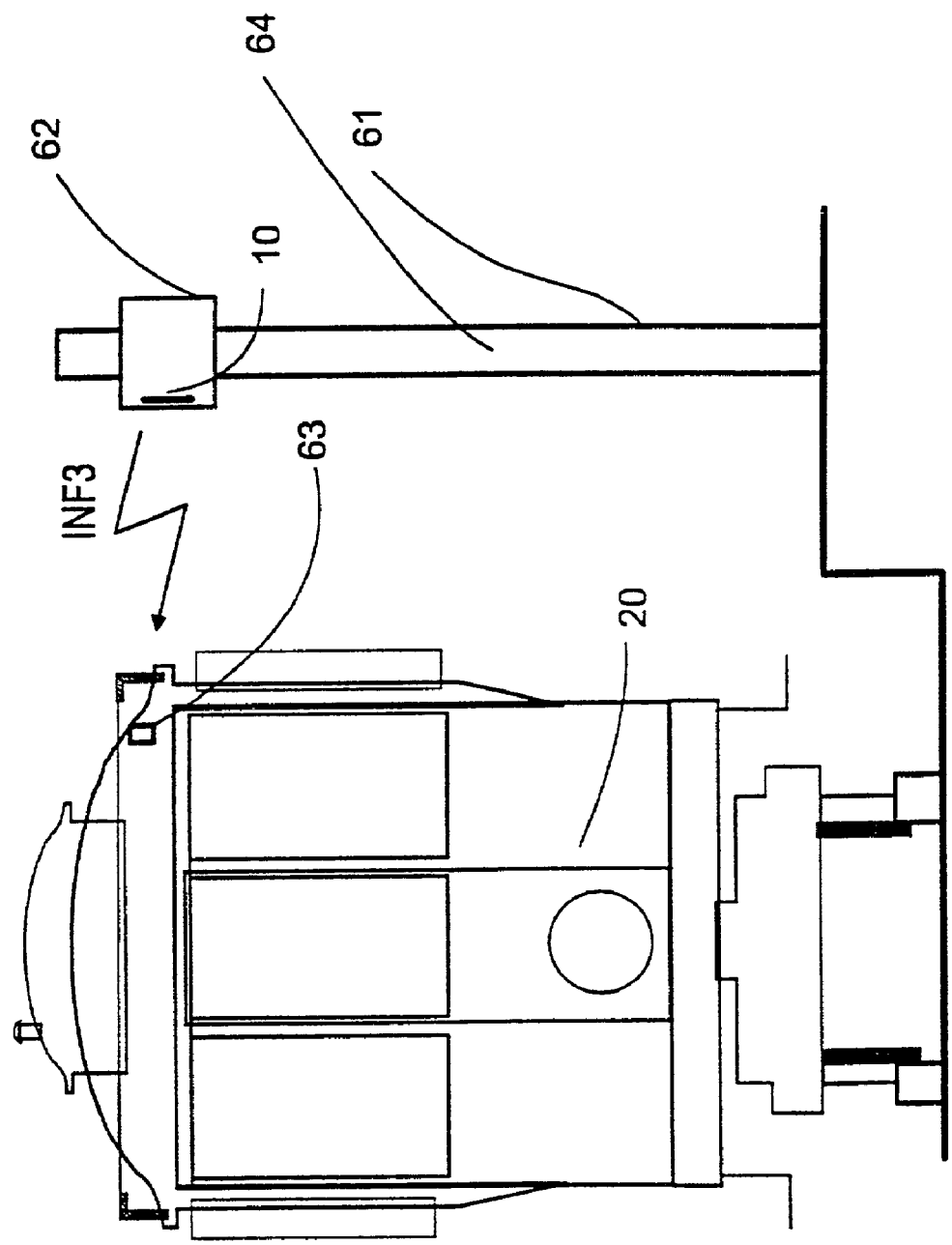
FIG. 6 is a diagrammatic illustration of a configuration with an electronic ticket as a marker for the transmission of locational information to a vehicle traveling therepast according to the invention.

The transmission of the current locational information to a vehicle 20, such as, for example, a subway train carriage, cannot be accomplished by a GPS receiver in tunnel sections. For such a purpose, in a special embodiment of the invention, an electronic ticket 10 is used. FIG. 6 shows in elevation a vehicle 20 that is passing a marker 64. The marker 64 is formed by a mast 61 and a recording box 62 fastened to the mast 61 at approximately the height of the vehicle roof. Accommodated in the recording box 62 are an embodiment of an electronic ticket 10 and a non-illustrated power supply unit. By an initialization stored in the program memory 45, the ticket 10 sends an information unit INF3 with, for example, a duty cycle of 3%. Disposed on the roof of the vehicle 20 is a receiving unit 63, which is connected either to an onboard computer 35 or to at least one second transmitting/receiving unit 32. The information units INF3 transmitted to the receiving unit 63 are identified in the fields STATE3 and/or ATTRIBUTES3 such that the information specified in POSITION3 is evaluated by the onboard computer 35 or by the second transmitting/receiving unit 32 as locational information and is used for the communication with the tickets 10 located in the registration zone 22.

In railroad trains, it is not always possible to presume that there is a bus system for the connection of the carriages to one another. Accordingly, as already mentioned, a consistent course number cannot be used or presumed in all cases. In local transport, there is additionally the problem that a motorbus generally travels several times over the same route. Without an additional measure, such travel would have the consequence that a passenger who, for example, alights three stops before the terminus and, after a relatively short time at the stop, boards the same bus again in the opposite direction would be treated in the same way as a passenger with tickets not allowing registration to be correctly carried out. See in this respect steps E1 and E2. Such a situation would have the consequence of a charge being made for the stop X—terminus—stop X sections of the route. To eliminate such a case of an unjustified charge being made, a further embodiment of the invention is explained below with reference to FIG. 7.

Figure 7:
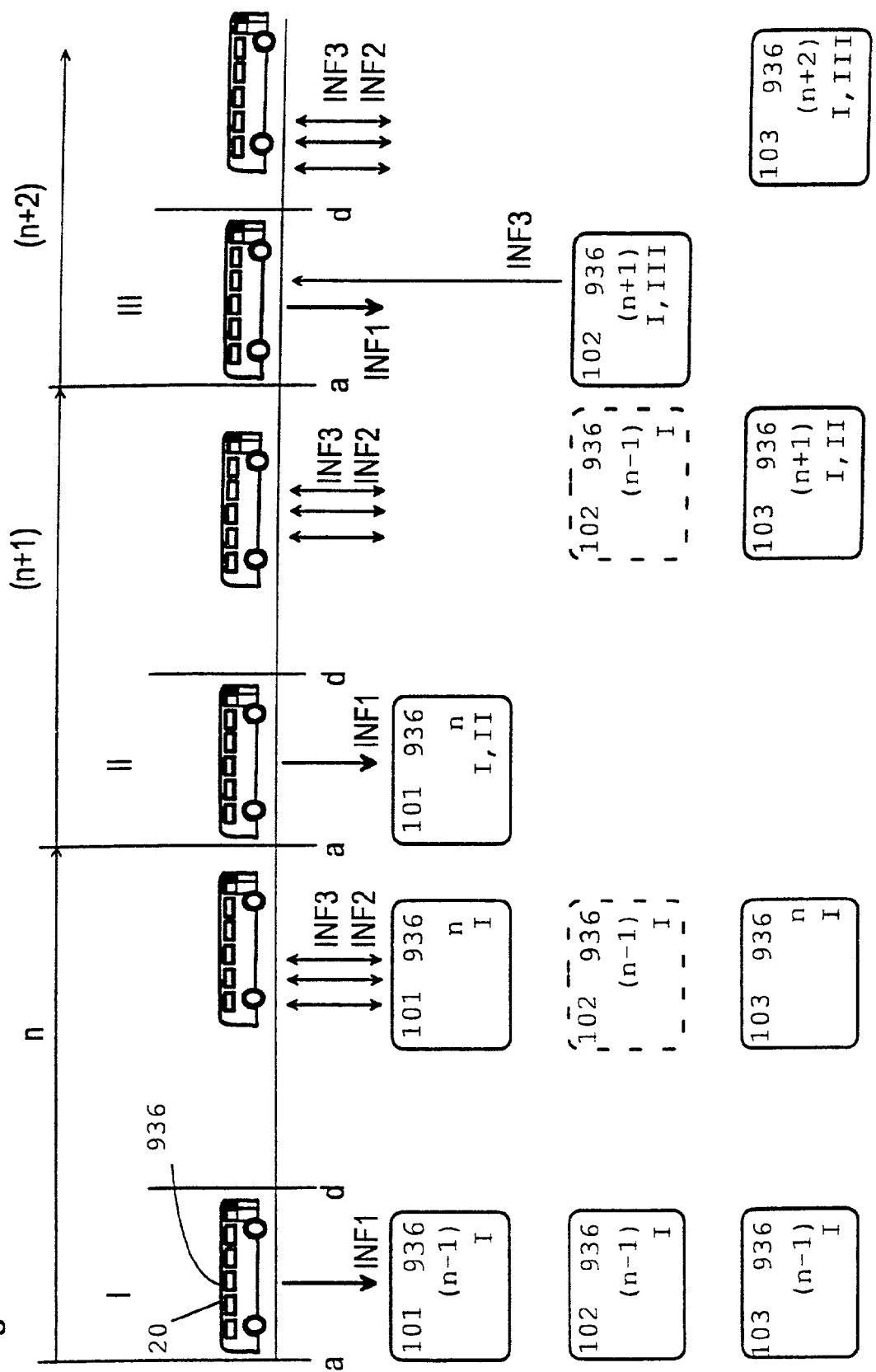
FIG. 7 is a diagrammatic illustration of the transmission of journey section numbers in an embodiment according to the invention.

In FIG. 7, I, II, and III designate three stops and n, (n+1), and (n+2) designate the associated sections of the journey. The arrival of a bus 20 is designated by a (arrive) and the departure is designated by d (depart). It is assumed that 936 is provided as the vehicle number in the transmitting/receiving units 31 and 32 of the bus 20. Also assumed are three tickets with the numbers 101, 102, and 103. To avoid the problems mentioned above of unjustified registration on the basis of a terminus, on the vehicle the sections of the journey are consecutively numbered with a randomly chosen initial number. Such numbering is also commonly referred to by the term "virtual numbering". According to FIG. 7, these are the virtual numbers n, (n+1), and (n+2). If the vehicle 20 reaches a terminus, the journey section number stored on the vehicle 20 is changed by a relatively great value, for example, by the value 1089 or −1089. The journey section counter is in this case configured as a modulo k counter; k has, for example, a value of $2^{16}$=65536. The virtual numbering can also be performed with a counting increment greater than one and by incrementing or decrementing by a fixed value.

Ticket 101

With ticket 101, a normal journey from I to II is undertaken. On boarding, it receives through the information unit INF1 the vehicle number 936, the position information I and the journey section n. On the ticket 10, the value decremented by 1 (n−1) is entered. After departure d, the bi-directional communication takes place with the information units INF1 and INF2. As a result, the section n is then entered on the ticket 101. On alighting at the location II, the current position II is added to the information unit INF1 on the ticket. Furthermore, the last stored journey section number is compared on the ticket 101 with that of the point of alighting 8; it is less by 1, i.e., the ticket has be registered correctly. The journey section number n is entered on the ticket 101.

Ticket 102

In the case of ticket 102, it is assumed that bi-directional communication cannot be performed for malicious or other reasons. On alighting at the location III, the ticket 102 is "woken" and thereby receives the information unit INF1. The comparison of the stored journey section number (n−1) with the current number (n+2), and the establishment that the vehicle number 936 is the same, shows that the ticket 102 has made the journey but was not registered. The ticket then reports its identity and the stored place of boarding I to the second transmitting/receiving unit 32 of the vehicle 20 by the unit INF3. On the ticket 102, the journey section number (n+1) is entered. In the comparison of the journey sections, an upper limit is provided. If the limit is exceeded in the comparison, this means that a passenger with the ticket has boarded the same bus again and not for instance made a "concealed" journey.

Ticket 103

Ticket 103 starts a normal journey from I to III and onward. The last location in each case is stored on the ticket and on the vehicle by the bi-directional communication, by the information units INF2 and INF3.

The method disclosed above with the section numbering is not restricted to journey sections as such; for example, in a stationary environment the method can also be applied to time sections, for example, in a resolution of 15 minutes, to establish the permanent or intermittent presence of a ticket in a registration zone 22.

Figure 8:
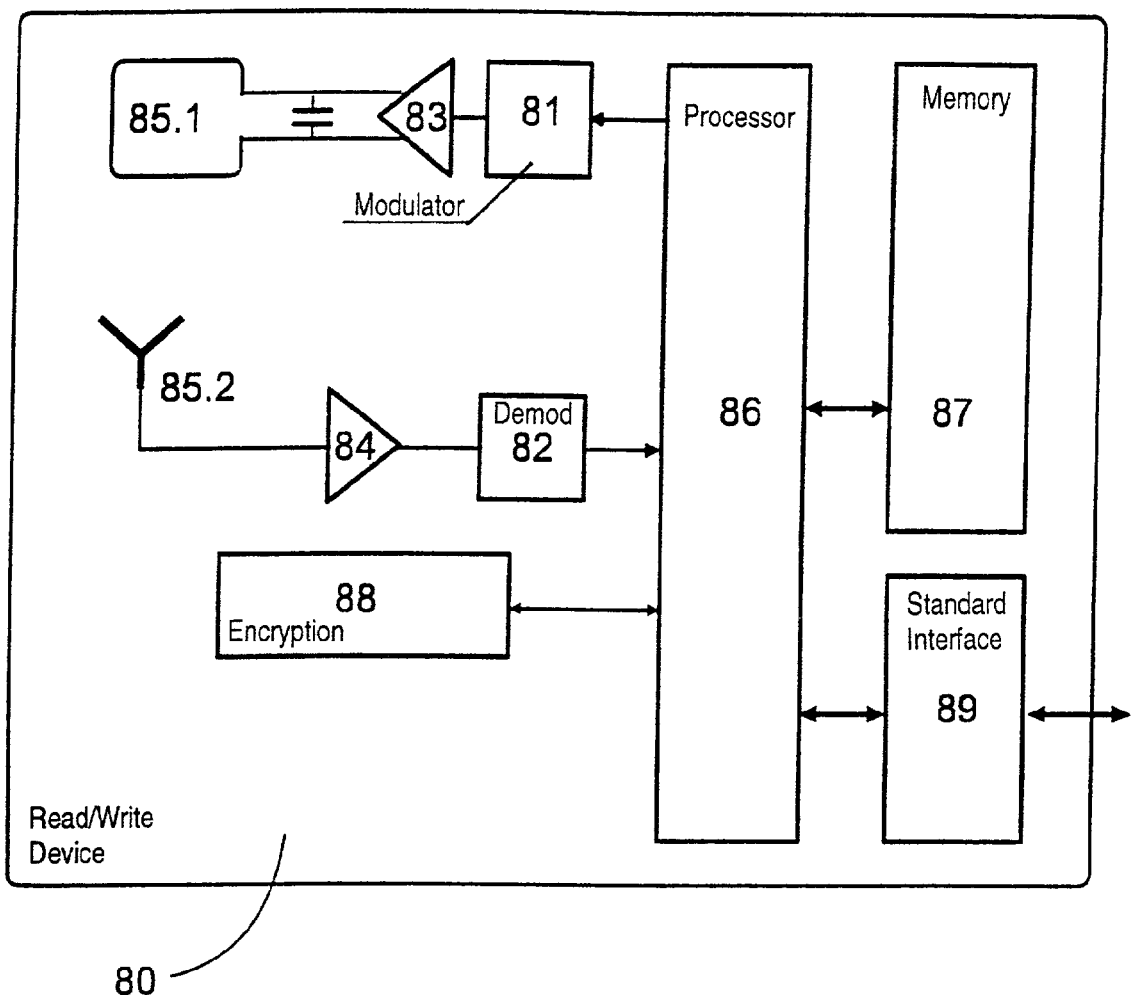
FIG. 8 is a block circuit diagram of a reading/writing device for the assignment of an entitlement to a ticket according to the invention.

Shown in FIG. 8 is a block diagram of a preferred embodiment of a writing/reading device 80, which allows certain information to be transmitted onto a ticket 10 and information stored on the ticket 10 to be read. The writing/reading device 80 contains a processor module 86 and a memory module 87, which is divided into a read-only memory and a volatile memory. The communication with a ticket 10 by the transmission of a first information unit INF1 takes place through a modulator 81 and a downstream transmitting amplifier 83, to which a frame antenna 85.1 is connected; also connected in parallel therewith is a resonance capacitor. Data stored in the ticket 10 are received by a rod antenna 85.2 and fed through a receiving amplifier 84 and a demodulator 82 to a processor system 86. The writing/reading device 80 may have an encryption module 88. The writing/reading device 80 is preferably connected through a standardized interface 89, for example, Universal Serial Bus (USB), to a customary personal computer, which, for its part, is connected to a network. Standardized interfaces such as USB, which also allow power to be supplied to the writing/reading device, are used with preference. With the writing/reading device 80 it is possible by a further refinement of the method according to the invention to allocate to a ticket 10 an individual entitlement or information identifying a person: an entitlement is fetched by a transport company by a data connection to the network, for example, by electronic payment facilities, and passed on for transmission to an electronic ticket 10. The fetching of the entitlement is referred to as validation. Because the entitlement may only be transmitted to the ticket 10 with express authorization, an encryption module 88 that encrypts the information to be transmitted and possibly provides it with an electronic signature to ensure the authenticity of the point where such a ticket 10 is issued, is provided in the writing/reading device. With these security measures, it is possible for even a private user at home to issue to oneself an entitlement to an electronic ticket 10. The embodiment is preferably applied to what are referred to as debit-card tickets 10. With the same method, a ticket 10 can also be provided with the identity of the legitimate owner.

Apart from the USB interface 89, the construction of an inspection unit 50 corresponds to the construction of the writing/reading device 80 explained above. Both units allow a particularly simple form of link with a ticket 10 from a mechanical viewpoint; due to the inductive transmission to the ticket 10 and the electromagnetic transmission from the ticket 10, there is no need for an electrical coupling. It is, for example, only necessary to place the ticket 10 onto a small recess of the housing or push it into a single slot in the writing/reading device 80 or in the inspection unit 50. In the application "entitlement to be transmitted", the information unit INF1 to be transmitted may contain the corresponding command in the field COMMAND1; based upon such a command, the further fields transmitted with the unit INF1 are correspondingly interpreted by the processor module 16 of the ticket 10. Depending on the amount of information to be transmitted, the transmission of these entitlements may also take place iteratively. With a rectifier module 97 contained on the ticket 10 in a special embodiment, the battery 19 can be charged up through the power supply module 18; the voltage generated by the inductive coupling is transformed in the rectifier module 97 into a DC voltage and fed to the power supply module 18. With the writing/reading device 80, an electronic ticket 10—also referred to as an e-ticket—can be handled like a classic cardboard ticket. A ticket issuing it point can also used the writing/reading device 80.

Figure 9:
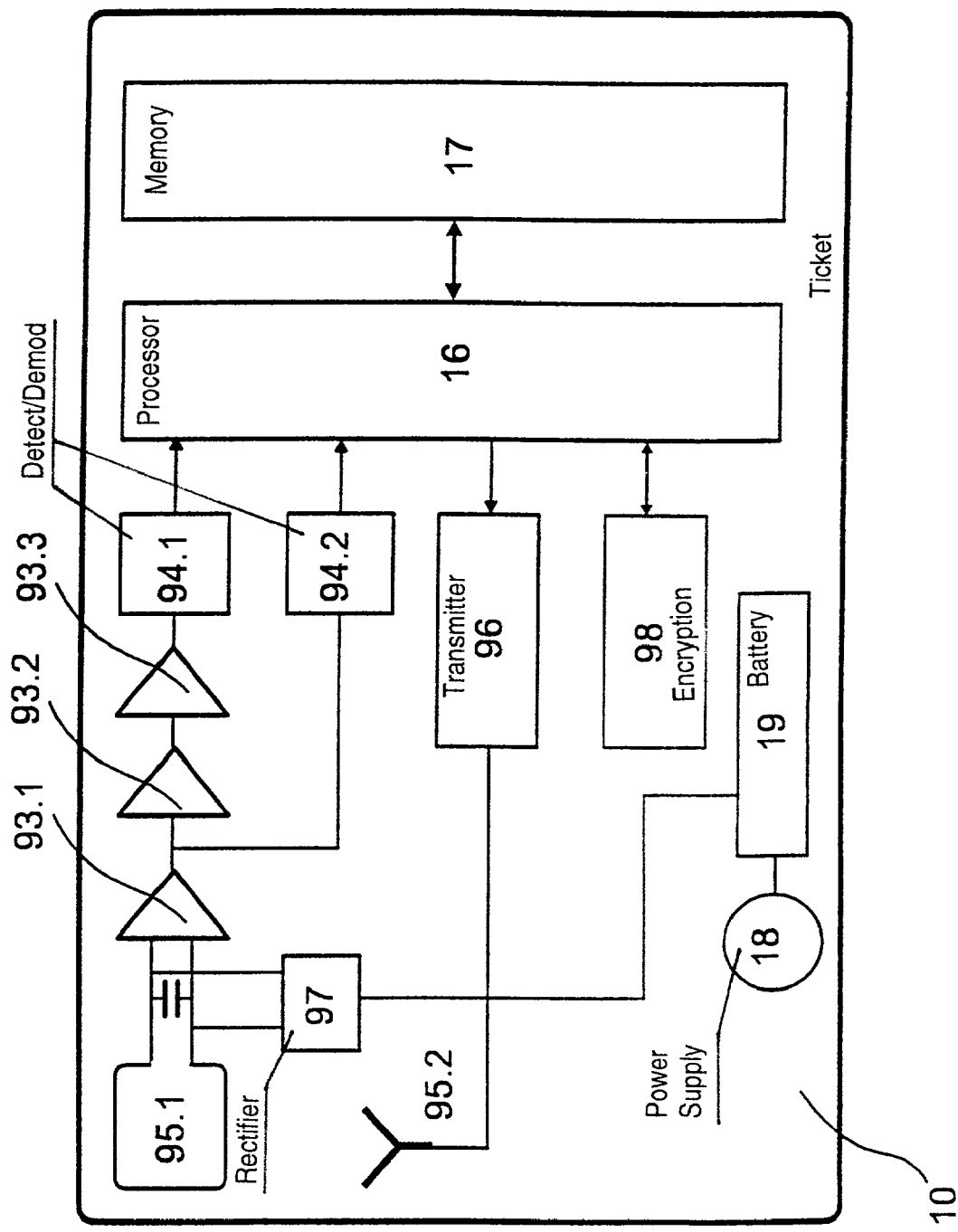
FIG. 9 is a block circuit diagram of an alternative embodiment of the electronic ticket of FIG. 1.
Figure 10:
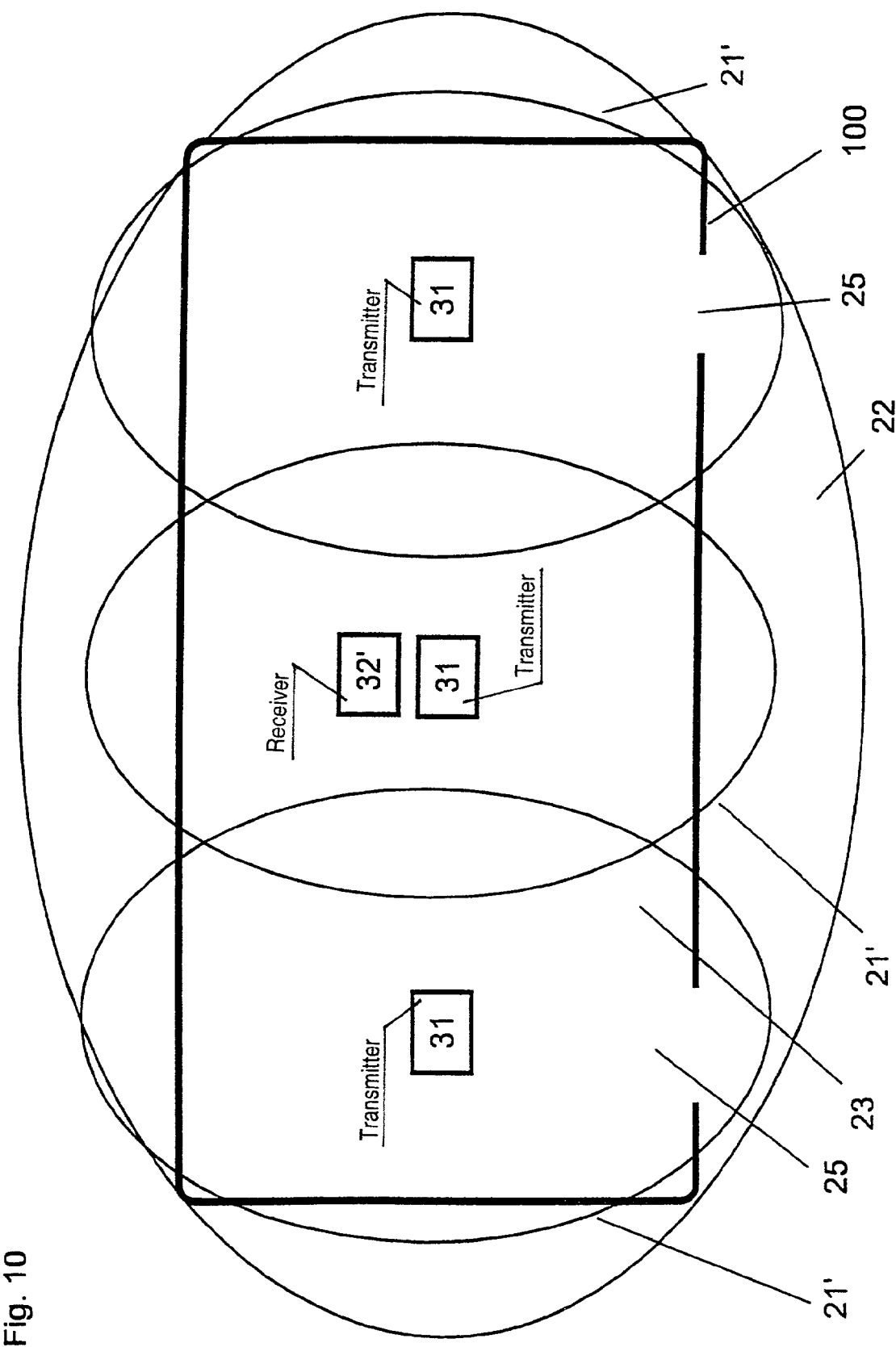
FIG. 10 is a diagrammatic representation of a motor bus with a configuration including a first transmitting unit and a receiving unit and associated zones according to the invention.

A further embodiment of the invention is explained by the block diagram of a ticket 10 according to FIG. 9, a configuration in a motorbus 100 according to FIG. 10, and the individual method steps for registration according to FIG. 11.

According to FIG. 9, the ticket 10 has a frame antenna 95.1, preferably with a parallel-connected resonance capacitor, which are connected through amplifiers 93.1, 93.2, 93.3 through two setpoint detectors/demodulators 94.1 and 94.2 to the processor module 16. The number of amplifiers depends on the circuit requirements and is insignificant for the invention. The two setpoint detectors 94.1, 94.2 allow the establishment of a source identity from which an information unit INF1 was transmitted to the ticket 10. In addition, the processor module 16 can establish the meaning of the first information unit received after analysis has taken place, for example, of the content COMMAND1. By contrast with the embodiment according to FIG. 1, ticket 10 has a modulator and only one transmitting module 96. Depending on the application, an encryption module 98 is also provided on the ticket 10. In the motorbus 100, three first transmitting units 31 are provided, each with an associated waking zone 21', and also a receiving unit 32', with an associated registration zone 22.

The registration of tickets 10 in the motorbus 100 takes place by the steps specified in FIG. 11. A first transmitting unit 31 sends a first information unit INF1 at a fixed or adjustable time interval $t_{REP}$ to the tickets 10 located in the associated waking zone 21'. The tickets 10 temporarily leave the sleeping state and, in each case after a ticket-individual random time $t_{RAND'}$, $t_{RAND''}$, . . . send an information unit INF3 to the receiving unit 32'. With the randomly determined time, collisions can largely be avoided, but cannot be ruled out. However, dependable registration is ensured by the first transmitting unit 31 continually re-waking the tickets with a periodicity $T_{REP}$. Within the motorbus 100, the waking cycles can he performed in a staggered manner by the various first transmitting units 31. In the first information unit INF1, the fields COMMAND1 and TYPE1 can cause the processor module 16 to instigate reversion to the sleeping state of the ticket 10 immediately after sending out an information unit INF3. Such an embodiment according to the invention ensures that even tickets 10 with a block diagram according to FIG. 1, and according to the method steps specified by FIG. 3, are registered reliably, even in such an environment with only a second receiving unit 32', i.e., without a second transmitting/receiving unit 32. The data saving of the ticket records can also be performed in the same way as with the measures disclosed according to FIGS. 1 and 3. The activation of the transmitting units 31 preferably takes place after the doors have been closed and the motorbus has departed. Such action avoids registrations that could be caused by merely boarding and leaving a motorbus, for example, by providing assistance in boarding.

Registration machines at the entrance to a vehicle can also register the ticket 10 according to the invention. These registration machines are of the type of the writing/reading device 80 described above. As a result, multiple uses of the ticket 10 according to the invention and of the registration method are possible.

The method according to the invention can also be used for making use of comparable services and charging for them, for example, as an entry ticket to a movie theater or exhibition. At an exhibition there are often various additional sections for which payment is required. The method according to the invention allows a visitor to visit certain such sections only once without a supplementary payment.

Similarly, the invention can also be used for the monitoring and protection of persons in certain zones. Such monitoring and/or protection may be required in installations where there is a potential risk of accident and the last registered whereabouts of a person or of the electronic identity card associated with that person can be established with the aid of the invention so that members of a rescue team can conduct a targeted search. Similarly, the invention may also be used to allow a profile of the movements of a person in a highly sensitive area with different zones to be recorded, for example, including for the monitoring of a person kept in what is referred to as semi-captivity.

The method according to the invention also allows objects on a conveying path to be monitored. For such a purpose, an electronic ticket is preferably fastened in a secured manner to the object concerned.

The invention can also be used for the generation and evaluation of statistical data, for example, the occupancy of a train, without the method also resulting in charging with payment required. In particular, the invention allows statistical evaluations to be conducted virtually in real time.

We claim:

1. A method for registering tickets, which comprises:
   defining a waking zone and associating the waking zone with at least one transceiver unit disposed in the waking zone, the transceiver unit having a transmitting unit;
   defining a registration zone and associating the registration zone with a registration transceiver unit;
   providing tickets having:
      a processor module;
      a memory module;
      at least one ticket receiving module; and
      at least one ticket transceiver module for communicating between the waking zone and the tickets;
   transmitting, via a near range unidirectional communication, a first information unit from the transmitting unit to a ticket receiving module of a ticket located in the waking zone;
   intermittently activating, with the processor module, the ticket transceiver module of the ticket located in the waking zone with an item of information contained in the first information unit;
   at a point in time determined by a beginning of a ticket registration, setting up a higher range bi-directional communication between the registration transceiver unit and a ticket transceiver module of a ticket located in the registration zone through additional information units including second and third information units, and registering a presence of the ticket at least once to establish at least one of a service to be used and a defined presence, wherein the second and third information units include at least information concerning a location of the ticket and at least one of a date and a time;

storing the information in at least one of:
an area of the memory module of the ticket; and
a data bank associated with at least one of the group consisting of an onboard computer, a remote computer system, and the registration transceiver unit;
based upon the information concerning the location, transmitting a virtual journey section number in the second information unit to the tickets located in the registration zone and changing the journey section number for each section of a journey by a counting increment; and
comparing the journey section number stored on the ticket with a current journey section number to determine if the ticket was correctly registered in previous sections of the journey.

2. The method according to claim 1, which further comprises:
defining a plurality of registration zones; and
carrying out the registration step by registering a presence of a ticket only for all tickets located in the registration zone having received an identical item of information associated with at least one of the registration zones concerning the location and the date and time.

3. The method according to claim 1, which further comprises:
providing a fixed ticket transmitting locational information fields;
attaching a receiving unit to a vehicle; and
transmitting the information concerning the location with the locational information fields from the fixed ticket through the receiving unit to the registration transceiver unit utilizing the third information unit.

4. The method according to claim 1, which further comprises establishing an activation timepoint of the ticket transceiver module with at least one of the group consisting of:
an item of information in the first information unit; and
an item of information in the second information unit.

5. The method according to claim 4, which further comprises determining the activation timepoint of the ticket transceiver module with a random generator.

6. The method according to claim 1, wherein the second information unit includes at least one of:
information identifying the ticket; and
personal information fields identifying a person assigned to the ticket; and
which further comprises acknowledging a reception of the third information unit by transmitting a further second information unit to the respective ticket.

7. The method according to claim 1, which further comprises selecting a frequency of the transmitting unit to form a field of the waking zone as a near field.

8. The method according to claim 1, which further comprises selecting a frequency of the registration transceiver unit to form a field of the registration zone as a far field.

9. The method according to claim 7, which further comprises selecting a frequency of the registration transceiver unit to form a field of the registration zone as a far field.

10. The method according to claim 1, which further comprises:
transmitting the first information unit from a writing/reading device to the ticket, the first information unit indicating one of an entitlement to use of a service and an identification; and
setting up bi-directional communication between the writing/reading device and the ticket with the third information unit by activating the ticket transceiver module of the ticket located in the waking zone with the item of information contained in the first information unit.

11. The method according to claim 1, which further comprises:
monitoring the intermittent activation of the ticket transceiver module with a timing element; and
switching off the ticket transceiver module after a fixed time upon permanent activation of the ticket transceiver module.

12. The method according to claim 1, which further comprises carrying out the setting up and registering steps by commencing bi-directional communication with the tickets through a registration transceiver unit lying within a registration area and performing a first registration in accordance with one of a state of the ticket and a pre-history of the communication both within a randomly determined respective time interval.

13. The method according to claim 1, wherein the at least one ticket transceiver module of the ticket is a first ticket transceiver module and the tickets each have a second ticket transceiver module; and which further comprises:
defining a passing zone associated with a stationary transceiver unit, the second ticket transceiver module setting up one of unidirectional and bi-directional communication with the stationary transceiver unit; and
granting access to the zone and registering a presence of a ticket in accordance with data stored in one of the group consisting of:
a memory area of the memory module; arid
a data bank of a computer system associated with the second ticket transceiver module.

14. The method according to claim 13, where the tickets each have a third ticket transceiver module; and which further comprises:
providing an issuing machine having a fourth transceiver unit, the third ticket transceiver module setting up bi-directional communication with the fourth transceiver unit, and
storing at least one of personal-information fields identifying a person and personal-information fields associated with a person in an area of the memory module.

15. The method according to claim 14, which further comprises identifying registrations of the tickets by attributes and performing actions, dependent on the attributes, selected from the group consisting of:
only acknowledging presence of the tickets; and
indicating use of a service requiring payment.

16. The method according to claim 15, which further comprises:
establishing the attributes with the issuing machine through a communication with the third ticket transceiver module; and
on an output module of the ticket, displaying, dependent upon the attributes, one of the attributes and a given item of information.

17. The method according to claim 1, which further comprises registering the ticket for one of authorizing transportation, authorizing entry to an exhibition, and authorizing entry in a protected zone.

18. A system for registering tickets for establishing at least one of a service to be used and a defined presence, comprising:

tickets each having:
  a processor module;
  a memory module connected to said processor module;
  at least one ticket receiving module connected to said processor module; and
  a ticket transceiver module;
at least one transceiver unit for communicating with said ticket receiving module, said transceiver unit including a transmitting unit disposed in a waking zone for transmitting, via a near range unidirectional communication, a first information unit to said ticket receiving module and intermittently activating, with said processor module, said ticket transceiver module of a respective one of said tickets located in said waking zone with an item of information contained in said first information unit;
a registration transceiver unit disposed in a registration zone, said transceiver unit, at a point in time determined by a beginning of a ticket registration, setting up a higher range bi-directional communication between said registration transceiver unit and said ticket transceiver module through additional information units including second and third information units when a respective one of said tickets is located in the registration zone, said second and third information units including at least information concerning a location of the ticket and at least one of a date and a time;
a data bank associated with at least one of the group consisting of an onboard computer, a remote computer system, and said registration transceiver unit; and
at least one of said registration transceiver unit and said processor module being programmed to register a presence of said tickets as ticket records in a respective one of said data bank and said memory module;
based upon the information concerning the location, a virtual journey section number in said second information unit being transmitted to a respective one of said tickets located in the registration zone and said journey section number for each section of a journey being changed by a counting increment; and
said journey section number stored on said ticket being compared with a current journey section number to determine if said ticket was correctly registered in previous sections of the journey.

19. The system according to claim 18, wherein:
communication between said tickets and said registration transceiver unit is at a given frequency through a given transmission method; and
said transmitting unit and said registration transceiver unit are connected to said onboard computer through a radio link at said given frequency and applying said given transmission method.

20. The system according to claim 18, wherein:
said tickets each have a second ticket transceiver module; and
a third transceiver unit communicates with said second ticket transceiver module.

21. The system according to claim 20, wherein:
said tickets each have a third ticket transceiver module; and
an issuing machine has a fourth transceiver unit communicating with said third ticket transceiver module.

22. The system according to claim 21, wherein:
said issuing machine is a portable inspection unit having:
  a display displaying said ticket records; and
  a slot for receiving at least one ticket;
said transmitting unit and said transceiver unit communicate with said inspection unit.

23. The system according to claim 18, including:
a receiving unit associated with the registration zone;
a fixed ticket transmitting locational information concerning a given location with information fields to said receiving unit; and
said receiving unit coupled to at least one of said transmitting unit and said transceiver unit for supplying the locational information thereto.

24. The system according to claim 18, wherein:
at least one information unit is transmitted to said tickets indicating one of an entitlement to use of a service and an identification; and
a writing/reading device has:
  a ticket recording device;
  a processor system connected to said ticket recording device;
  a receiving antenna and a receiving amplifier connected to said receiving antenna and to said processor system, said receiving antenna inductively coupling to said tickets; and
  a transmitting antenna and a transmitting amplifier connected to said transmitting antenna and to said processor system, said transmitting antenna electromagnetically coupling with said tickets.

25. A method for registering tickets to establish at least one of a service to be used and a defined presence, which comprises:
providing tickets each having a processor module, a memory module, at least one receiving module, and at least one transmitting module;
defining a registration zone and associating the registration zone with a registration transceiver unit for communicating with the tickets, the registration transceiver unit having a transmitting unit and a receiving unit;
transmitting a first information unit, via a near range unidirectional communication, from the transmitting unit to the receiving module of tickets located in the registration zone;
intermittently activating, with the processor module, the transmitting module contained on the ticket with an item of information contained in the first information unit to cause transmission, via a higher range bi-directional communication, of a further information unit to the receiving unit of the registration transceiver unit, the first and further information units including at least information concerning at least one of location, date, and time; and
upon receiving the further information unit, registering a respective presence of tickets at least once as a ticket record;
storing the information in the first and further information units in at least one of:
  an area of the memory module; and
  a data bank associated with at least one of the group consisting of an onboard computer, a remote computer system, and the receiving unit;
based upon the information concerning the location, transmitting a virtual journey section number in the first information unit to the tickets located in the registration zone and changing the virtual journey section number for each section of the journey by a counting increment; and comparing the journey section number stored on the ticket with a current journey section number to determine if the ticket was correctly registered in previous sections of the journey.

26. The method according to claim 25, which further comprises determining the activation timepoint of the transmitting module with a random generator.

27. The method according to claim 25, which further comprises selecting a frequency of the transmitting unit to form a field in the registration zone as a near field.

28. The method according to claim 25, which further comprises selecting a frequency of the transmitting module to form a field in the registration zone as a far field.

29. The method according to claim 25, which further comprises:
    transmitting the first information unit from a writing/reading device to the ticket, the first information unit indicating one of an entitlement to use of a service and an identification; and
    setting up bi-directional communication between the writing/reading device and the ticket with the further information unit by activating the transmitting module contained on the ticket with the item of information contained in the first information unit to cause transmission of the further information unit to the receiving unit of the registration transceiver unit.

30. The method according to claim 29, which further comprises:
    coupling the writing/reading device to a network; and
    only enabling the transmission of the entitlement to use of a service, contained in the first information unit, to the ticket if the entitlement has been validated beforehand through the network.

31. The method according to claim 30, which further comprises:
    at least one of pushing the ticket into the writing/reading device and placing the ticket onto the writing/reading device;
    transmitting the first information unit to the ticket by an inductive coupling; and
    transmitting the further information unit to the writing/reading device by an electromagnetic coupling.

32. The method according to claim 25, which further comprises registering the ticket for one of authorizing transportation, authorizing entry to an exhibition, and authorizing entry in a protected zone.

33. A system for registering tickets at a registration zone for establishing at least one of a service to be used and a defined presence, comprising:
    tickets each having:
      a processor module;
      a memory module connected to said processor module;
      at least one receiving module connected to said processor module; and
      at least one transmitting module;
    at least one transceiver unit for communicating with said tickets, said transceiver unit disposed in the registration zone and including:
      a receiving unit disposed in the registration zone; and
      at least one transmitting unit communicating with said receiving module and said transmitting module, said transmitting unit disposed in the registration zone;
    a data bank coupled to said receiving unit; and
    a presence of said tickets located in the registration zone being registered as ticket records in at least one of said memory module and said data bank by a first information unit transmitted, via a near range unidirectional communication, to said tickets and intermittently activating said transmitting module of said tickets and a further information unit transmitted, via a higher range bi-directional communication, from said tickets to said receiving unit, the first and further information units including at least information concerning at least one of location, date, and time;
    the information in the first and further information units being stored in at least one of:
      an area of the memory module; and
      a data bank associated with at least one of the group consisting of an onboard computer, a remote computer system, and the receiving unit;
    based upon the information concerning the location, a virtual journey section number in the first information unit being transmitted to the tickets located in the registration zone and the virtual journey section number for each section of the journey being changed by a counting increment; and
    the journey section number stored on the ticket being compared with a current journey section number to determine if the ticket was correctly registered in previous sections of the journey.

34. The system according to claim 33, wherein said transmitting unit transmits at a frequency to form a field in the registration zone as a near field.

35. The system according to claim 33, wherein said transmitting module transmits at a frequency to form a field in the registration zone as a far field.

36. The system according to claim 34, wherein said transmitting module transmits at a frequency to form a field in the registration zone as a far field.

37. The system according to claim 33, wherein
    at least the first information unit is transmitted to said tickets indicating one of an entitlement to use of a service and an identification; and
    a writing/reading device has:
      a ticket recording device;
      a processor system connected to said ticket recording device;
      a receiving antenna and a receiving amplifier connected to said receiving antenna and to said processor system, said receiving antenna inductively coupling to said tickets; and
      a transmitting antenna and a transmitting amplifier connected to said transmitting antenna and to said processor system, said transmitting antenna electromagnetically coupling with said tickets.

* * * * *